United States Patent
Yang et al.

(10) Patent No.: US 12,448,376 B2
(45) Date of Patent: Oct. 21, 2025

(54) PHENOTHIAZINE FERROPTOSIS INHIBITOR, PREPARATION METHOD THEREFOR AND APPLICATION THEREOF

(71) Applicant: CHENGDU HENGHAO INNOVATIVE SCIENCE AND TECHNOLOGY CO., LTD., Sichuan (CN)

(72) Inventors: Shengyong Yang, Sichuan (CN); Linli Li, Sichuan (CN)

(73) Assignee: CHENGDU HENGHAO INNOVATIVE SCIENCE AND TECHNOLOGY CO., LTD., Sichuan (CN)

( * ) Notice: Subject to any disclaimer, the term of this patent is extended or adjusted under 35 U.S.C. 154(b) by 783 days.

(21) Appl. No.: 17/778,831

(22) PCT Filed: Nov. 18, 2020

(86) PCT No.: PCT/CN2020/129707
§ 371 (c)(1),
(2) Date: May 21, 2022

(87) PCT Pub. No.: WO2021/098715
PCT Pub. Date: May 27, 2021

(65) Prior Publication Data
US 2023/0021442 A1  Jan. 26, 2023

(30) Foreign Application Priority Data

Nov. 21, 2019 (CN) .......................... 201911150501.7

(51) Int. Cl.
| | | |
|---|---|---|
| C07D 471/04 | (2006.01) | |
| A61P 9/10 | (2006.01) | |
| C07D 417/06 | (2006.01) | |
| C07D 417/10 | (2006.01) | |
| C07D 495/04 | (2006.01) | |

(52) U.S. Cl.
CPC .............. *C07D 471/04* (2013.01); *A61P 9/10* (2018.01); *C07D 417/06* (2013.01); *C07D 417/10* (2013.01); *C07D 495/04* (2013.01)

(58) Field of Classification Search
CPC ..................................................... C07D 471/04
USPC ..................................................... 514/210.21
See application file for complete search history.

(56) References Cited

U.S. PATENT DOCUMENTS 5,807,880 A   9/1998   Okada et al.

FOREIGN PATENT DOCUMENTS

| CN | 1131944 A | 9/1996 |
|---|---|---|
| CN | 108484527 A | 9/2018 |
| CN | 109748884 A | 5/2019 |
| CN | 109796424 A | 5/2019 |
| CN | 111574474 A | 8/2020 |

OTHER PUBLICATIONS

International Search Report for PCT/CN2020/129707 mailed Feb. 22, 2021, ISA/CN.
Kim Ki-Suk et al., The Phenothiazine Drugs Inhibit hERG Potassium Channels, Drug and Chemical Toxicology, Dec. 31, 2005 (Dec. 31, 2005), vol. 28, abstract.
Keynes Robert G. et al., N10-carbonyl-substituted phenothiazines inhibiting lipid peroxidation and associated nitric oxide consumption powerfully protect brain tissue against oxidative stress, Chemical Biology and Drug Design, May 25, 2019 (May 25, 2019), vol. 94, abstract.

*Primary Examiner* — Taofiq A Solola
(74) *Attorney, Agent, or Firm* — Yue (Robert) Xu; Apex Attorneys at Law, LLP

(57) ABSTRACT

A phenothiazine ferroptosis inhibitor, a preparation method therefor and an application thereof. Specifically provided is a compound represented by formula I, or a salt thereof, or a stereoisomer thereof. The synthesized phenothiazine compound has a good inhibitory effect on ferroptosis and has good drug safety. Moreover, the compound can be used to prepare a ferroptosis inhibitor, and can also be used to prepare a drug for treating diseases related to ferroptosis, such as neurodegenerative diseases, tumors, tissue ischemia reperfusion injury, stroke, cardiovascular diseases, renal failure, and diabetic complications.

9 Claims, 1 Drawing Sheet

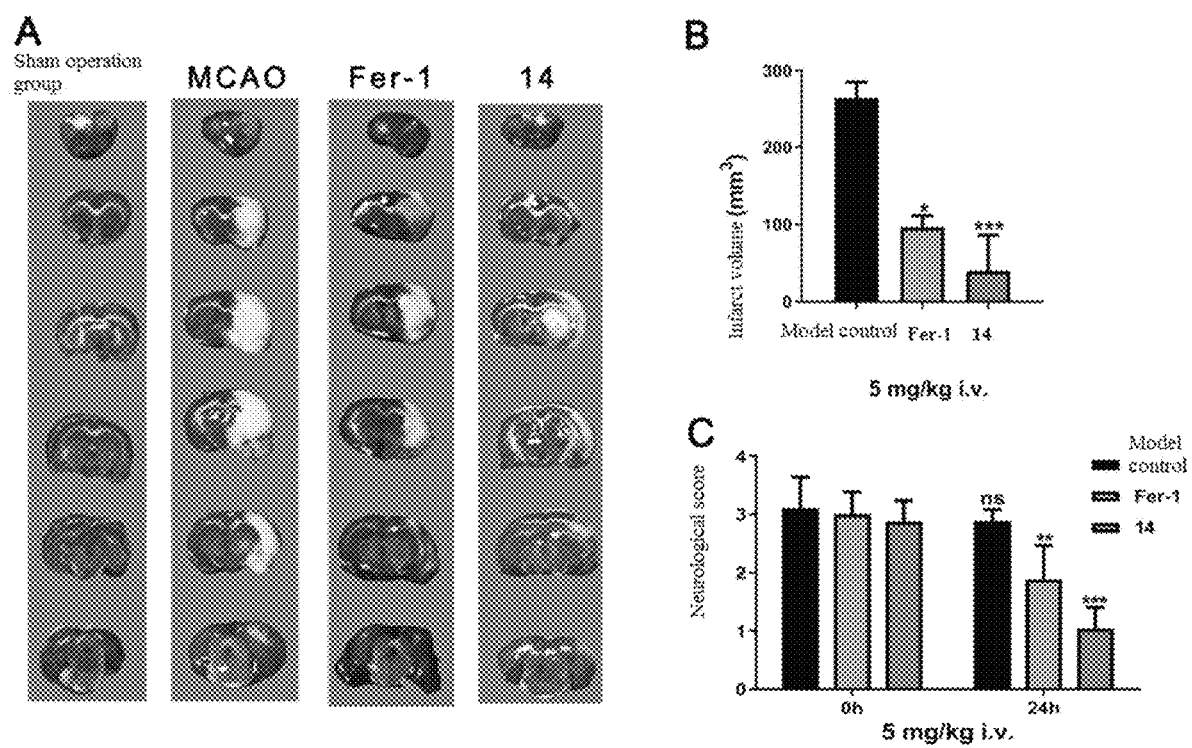

PHENOTHIAZINE FERROPTOSIS INHIBITOR, PREPARATION METHOD THEREFOR AND APPLICATION THEREOF

This application is the national phase of International Application No. PCT/CN2020/129707, titled "PHENOTHIAZINE FERROPTOSIS INHIBITOR, PREPARATION METHOD THEREFOR AND APPLICATION THEREOF", filed on Nov. 18, 2020, which claims the priority to Chinese Patent Application No. 201911150501.7, titled "PHENOTHIAZINE FERROPTOSIS INHIBITOR, PREPARATION METHOD THEREFOR AND APPLICATION THEREOF", filed on Nov. 21, 2019 with the China National Intellectual Property Administration, which is incorporated herein by reference in entirety.

FIELD

The present disclosure relates to the technical field of chemically synthesized drugs, and specifically relates to a phenothiazine ferroptosis inhibitor, a preparation method therefor and an application thereof.

BACKGROUND

Ferroptosis is an atypical way of cell death. The morphological features of ferroptosis are mainly reduced mitochondrial volume, increased mitochondrial membrane density, reduced or disappeared mitochondrial cristae, ruptured mitochondrial outer membrane, and normal nucleus size, which is the main morphological feature that distinguishes ferroptosis from apoptosis, necrosis, and autophagy. The biochemical characteristics of ferroptosis are mainly the accumulation of intracellular iron and ROS, activation of the mitogen-activated protein kinase (MAPK) signaling system, inhibition of the cystine/glutamate transporter system, and increased NADPH oxidation.

It is currently believed that ferroptosis is associated with degenerative diseases such as Alzheimer's disease and Parkinson's disease, as well as pathological cell death, for example, tumor, stroke, ischemia-reperfusion injury and renal cell degeneration.

At present, most small molecule inhibitors against ferroptosis are antioxidants or iron chelators. There are mainly three compounds with specific anti-ferroptotic activity in the prior art:

Ferrostatin: the first-generation ferrostatin, known as Ferrostatin-1, inhibits Erastin- and RSL3-induced iron ion formation in HT1080 cells. The activity of ferrostain-1 mainly depends on aromatic amines, which specifically inhibit the accumulation of ROS caused by lipid oxidation. Compared with ferrostatin-1, the second-generation (referred to as SRS11-92) and third-generation (referred to as SRS16-86) ferrostatins have better plasma and metabolic stability and significantly prevent tissue damage in the body (e.g., acute kidney injury and ischemia-reperfusion injury).

Liproxstatin-1: liproxstatin-1 prevents ROS accumulation and cell death in GPX4-/- cells. Furthermore, liproxstatin-1 inhibits FINs-induced ferroptosis. Liproxstatin-1 also protects mice from liver injury induced by ischemia-reperfusion.

Zileuton: zileuton is an orally active specific inhibitor of 5-LOX. Zileuton inhibits cytosolic ROS production, which provides significant effects in HT22 cells (mouse hippocampal cell line) that protect cells from glutamate- and ergotin-induced iron ion increases.

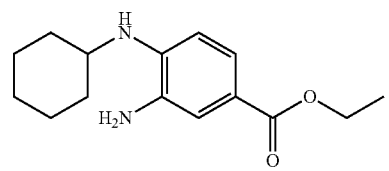

Ferrostain-1

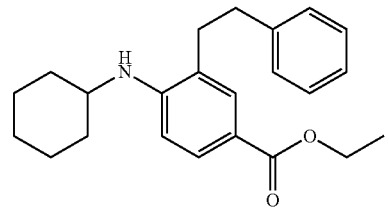

SRS11-92

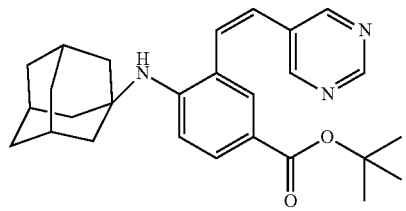

SRS16-86

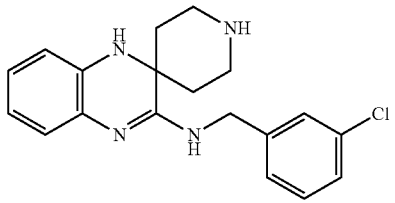

Liproxstatin-1

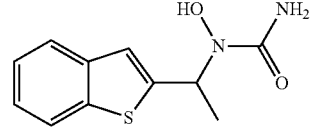

Zileuton

Although some ferroptosis inhibitors have been reported in the prior art, their activity is not high and their druggability is poor. Therefore, there is an urgent need for a ferroptosis inhibitor with better activity and good druggability in the prior art. It is an urgent problem to be solved that how to prepare a ferroptosis inhibitor with high activity and good drugability and capable of being used as a drug for the treatment of diseases such as neurodegenerative diseases, tissue ischemia-reperfusion injury, cerebral stroke, cardiovascular diseases, renal failure and diabetic complications.

SUMMARY

In order to solve the above problems, the present disclosure provides a phenothiazine ferroptosis inhibitor, and the present disclosure also provides a preparation method and use thereof.

In a first aspect, the present disclosure provides a compound represented by formula I, a salt thereof, or a stereoisomer thereof:

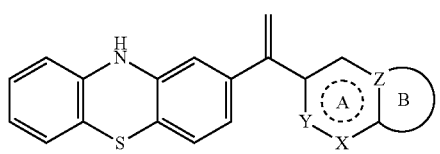

formula I wherein,
X and Y are independently selected from $CR_1$ and N;
Z is selected from C and N;
the dotted line indicates that there is at least one unsaturated double bond in ring A;
$R_1$ is selected from hydrogen, $C_1$~$C_8$ alkyl, halogen, hydroxyl, carboxyl, nitro, amino, and 3- to 8-membered saturated heterocyclyl;
ring B is selected from 3- to 8-membered saturated heterocyclyl or 3- to 8-membered unsaturated heterocyclyl independently substituted by n $R_2$;
n is an integer selected from 0, 1, 2, 3 and 4;
each $R_2$ is independently selected from substituted or unsubstituted $C_1$~$C_8$ alkyl, halogen, hydroxyl, carboxyl, amino, nitro, substituted or unsubstituted 3- to 8-membered saturated heterocyclyl, —C(O)$NR_3R_4$, —C(O)$R_5$ and —C(O)$OR_5$; or two $R_2$ on the same carbon atom constitute =O;
$R_3$ and $R_4$ are independently selected from hydrogen, substituted or unsubstituted $C_1$~$C_8$ alkyl, 3- to 8-membered saturated heterocyclyl, and substituted 3- to 8-membered unsaturated cycloalkyl;
$R_5$ is selected from hydrogen and $C_1$~$C_8$ alkyl;
the substituent of the alkyl is selected from substituted or unsubstituted 3- to 8-membered saturated heterocyclyl, 3- to 8-membered saturated cycloalkyl, —$NR_6R_7$, 3- to 10-membered unsaturated cycloalkyl, and $C_1$~$C_8$ alkoxy;
$R_6$ and $R_7$ are independently selected from $C_1$~$C_8$ alkyl;
the substituent of the saturated heterocyclyl is selected from $C_1$~$C_8$ alkyl and —C(O)$OR_5$;
the substituent of the unsaturated cycloalkyl is selected from $C_1$~$C_8$ alkyl, nitro, halogen, and hydroxyl; and
the heteroatom of the heterocyclyl is selected from N, O and S.
Further, the compound is a compound represented by formula II:

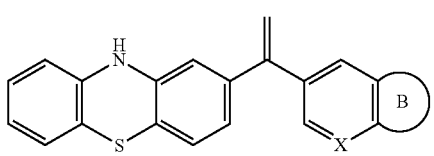

formula II wherein,
X is selected from $CR_1$ and N;
$R_1$ is selected from hydrogen, $C_1$~$C_8$ alkyl, halogen, hydroxyl, carboxyl, nitro, amino, 3- to 8-membered saturated heterocyclyl;
ring B is selected from 3- to 8-membered saturated heterocyclyl or 3- to 8-membered unsaturated heterocyclyl independently substituted by n $R_2$;
n is an integer selected from 0, 1, 2, 3 and 4;
each $R_2$ is independently selected from substituted or unsubstituted $C_1$~$C_8$ alkyl, halogen, hydroxyl, carboxyl, amino, nitro, substituted or unsubstituted 3- to 8-membered saturated heterocyclyl, —C(O)$NR_3R_4$, —C(O)$R_5$ and —C(O)$OR_5$; or two $R_2$ on the same carbon atom constitute =O;
$R_3$ and $R_4$ are independently selected from hydrogen, substituted or unsubstituted $C_1$~$C_8$ alkyl, 3- to 8-membered saturated heterocyclyl, and substituted 3- to 8-membered unsaturated cycloalkyl;
$R_5$ is independently selected from hydrogen and $C_1$~$C_8$ alkyl;
the substituent of the alkyl is selected from substituted or unsubstituted 3- to 8-membered saturated heterocyclyl, 3- to 8-membered saturated cycloalkyl, —$NR_6R_7$, 3- to 10-membered unsaturated cycloalkyl, and $C_1$~$C_8$ alkoxy;
$R_6$ and $R_7$ are independently selected from $C_1$~$C_8$ alkyl;
the substituent of the saturated heterocyclyl is selected from $C_1$~$C_8$ alkyl and —C(O)$OR_5$;
the substituent of the unsaturated cycloalkyl is selected from $C_1$~$C_8$ alkyl, nitro, halogen, and hydroxyl; and
the heteroatom of the heterocyclyl is selected from N, O and S.
Further,
X is selected from $CR_1$ and N;
$R_1$ is selected from hydrogen;
ring B is selected from 5- to 6-membered saturated heterocyclyl or 5- to 6-membered unsaturated heterocyclyl independently substituted by n $R_2$;
n is an integer of 0~3;
each $R_2$ is independently selected from substituted or unsubstituted $C_1$~$C_3$ alkyl, halogen, amino, substituted or unsubstituted 4- to 6-membered saturated heterocyclyl, —C(O)$NR_3R_4$, —C(O)$R_5$ and —C(O)$OR_5$; or two $R_2$ on the same carbon atom constitute =O;
$R_3$ and $R_4$ are independently selected from hydrogen, substituted or unsubstituted $C_1$~$C_2$ alkyl, 3- to 6-membered saturated heterocyclyl, and substituted 3- to 6-membered unsaturated cycloalkyl;
$R_5$ is independently selected from hydrogen and $C_1$~$C_4$ alkyl;
the substituent of the alkyl is selected from substituted or unsubstituted 3- to 6-membered saturated heterocyclyl, 4- to 5-membered saturated cycloalkyl, —$NR_6R_7$, 3- to 6-membered unsaturated cycloalkyl, and $C_1$~$C_4$ alkoxy;
$R_6$ and $R_7$ are independently selected from $C_1$~$C_3$ alkyl;
the substituent of the saturated heterocyclyl is selected from $C_1$~$C_4$ alkyl and —C(O)$OR_5$;
the substituent of the unsaturated cycloalkyl is selected from $C_1$~$C_4$ alkyl, nitro, halogen, and hydroxyl; and
the heteroatom of the heterocyclyl is selected from N, O and S.
Further, the compound is a compound represented by formula III:

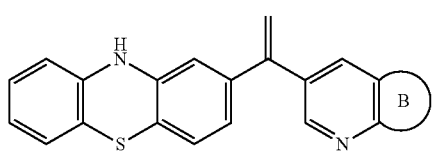

formula III wherein,
ring B is selected from 5- to 6-membered saturated heterocyclyl or 5- to 6-membered unsaturated heterocyclyl independently substituted by n $R_2$;
n is an integer of 0~1;
each $R_2$ is independently selected from substituted or unsubstituted $C_1$~$C_2$ alkyl, halogen, amino, and substituted or unsubstituted 4- to 6-membered saturated heterocyclyl;
the substituent of the alkyl is selected from substituted or unsubstituted 4- to 6-membered saturated heterocyclyl, 4- to 5-membered saturated cycloalkyl, and $C_1$~$C_3$ alkoxy;
the substituent of the saturated heterocyclyl is selected from $C_1$~$C_2$ alkyl and —C(O)O$R_5$;
$R_5$ is independently selected from hydrogen and $C_1$~$C_4$ alkyl;
the heteroatom of the heterocyclyl is selected from N, O and S.
Further, the compound is a compound represented by formula IV:

formula IV

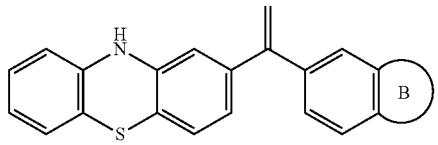

wherein,
ring B is selected from 5- to 6-membered saturated heterocyclyl or 5- to 6-membered unsaturated heterocyclyl independently substituted by n $R_2$;
n is an integer selected from 0, 1, 2, and 3;
each $R_2$ is independently selected from substituted or unsubstituted $C_1$~$C_3$ alkyl, halogen, amino, —C(O)N$R_3R_4$, —C(O)$R_5$ and —C(O)O$R_5$; or two $R_2$ on the same carbon atom constitute =O;
$R_3$ and $R_4$ are independently selected from hydrogen, substituted $C_1$~$C_2$ alkyl, and substituted aryl;
$R_5$ is independently selected from hydrogen and $C_1$~$C_2$ alkyl;
the substituent of the alkyl is selected from substituted or unsubstituted 5- to 6-membered saturated heterocyclyl, 4- to 6-membered saturated cycloalkyl, —N$R_6R_7$, aryl, naphthyl, and $C_1$~$C_3$ alkoxy;
$R_6$ and $R_7$ are independently selected from $C_1$~$C_3$ alkyl;
the substituent of the saturated heterocyclyl is selected from $C_1$~$C_8$ alkyl and —C(O)O$R_5$;
the substituent of the aryl is selected from $C_1$~$C_2$ alkyl and nitro; and
the heteroatom of the heterocyclyl is selected from N, O and S.
Further, the compound is a compound represented by formula V:

formula V

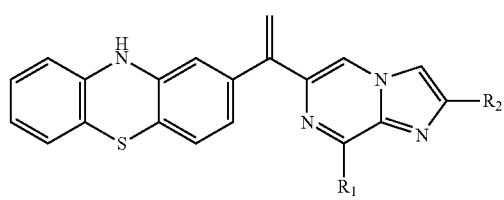

wherein,
$R_1$ is selected from hydrogen and 4- to 6-membered saturated heterocyclyl;
$R_2$ is null, or $R_2$ is selected from substituted or unsubstituted $C_1$~$C_3$ alkyl, halogen, substituted or unsubstituted 4- to 6-membered saturated heterocyclyl, —C(O)N$R_3R_4$, —C(O)$R_5$ and —C(O)O$R_5$; or two $R_2$ on the same carbon atom constitute =O;
$R_3$ and $R_4$ are independently selected from hydrogen, substituted or unsubstituted $C_1$~$C_3$ alkyl, 4- to 6-membered saturated heterocyclyl, and substituted 4- to 5-membered unsaturated cycloalkyl;
$R_5$ is selected from hydrogen and $C_1$~$C_4$ alkyl;
the substituent of the alkyl is selected from substituted or unsubstituted 4- to 6-membered saturated heterocyclyl, 4- to 6-membered saturated cycloalkyl, —N$R_6R_7$, aryl, and naphthyl;
$R_6$ and $R_7$ are independently selected from $C_1$~$C_2$ alkyl;
the substituent of the saturated heterocyclyl is selected from $C_1$~$C_4$ alkyl and —C(O)O$R_5$;
the substituent of the unsaturated cycloalkyl is selected from $C_1$~$C_4$ alkyl, nitro, halogen, hydroxyl; and
the heteroatom of the heterocyclyl is selected from N, O and S.
Further, the compound is a compound selected from the following group:

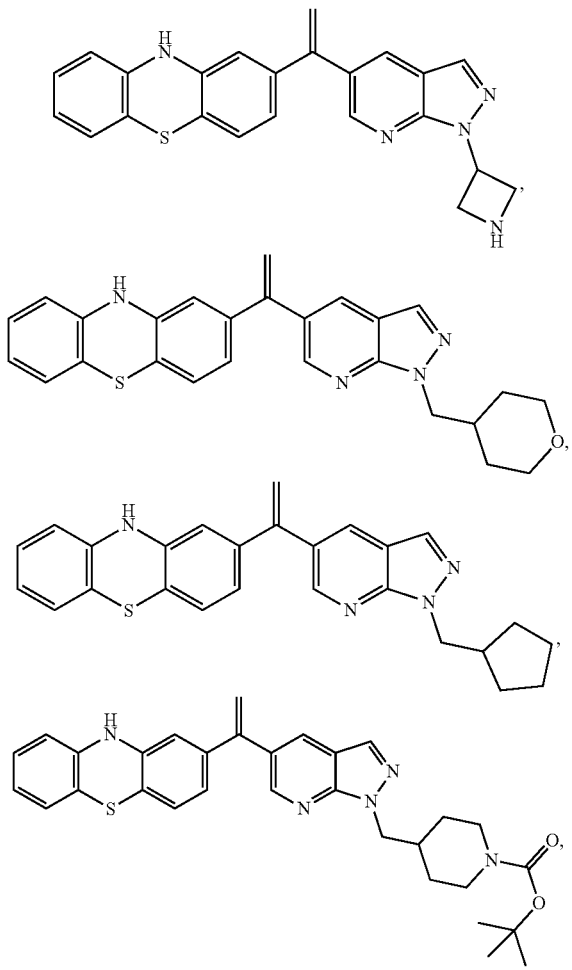

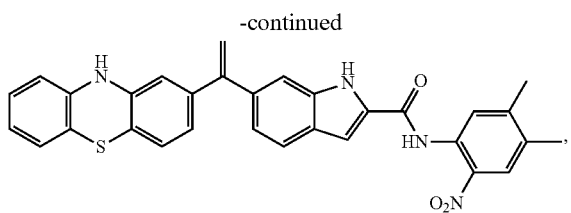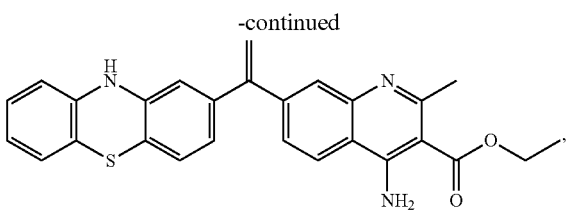

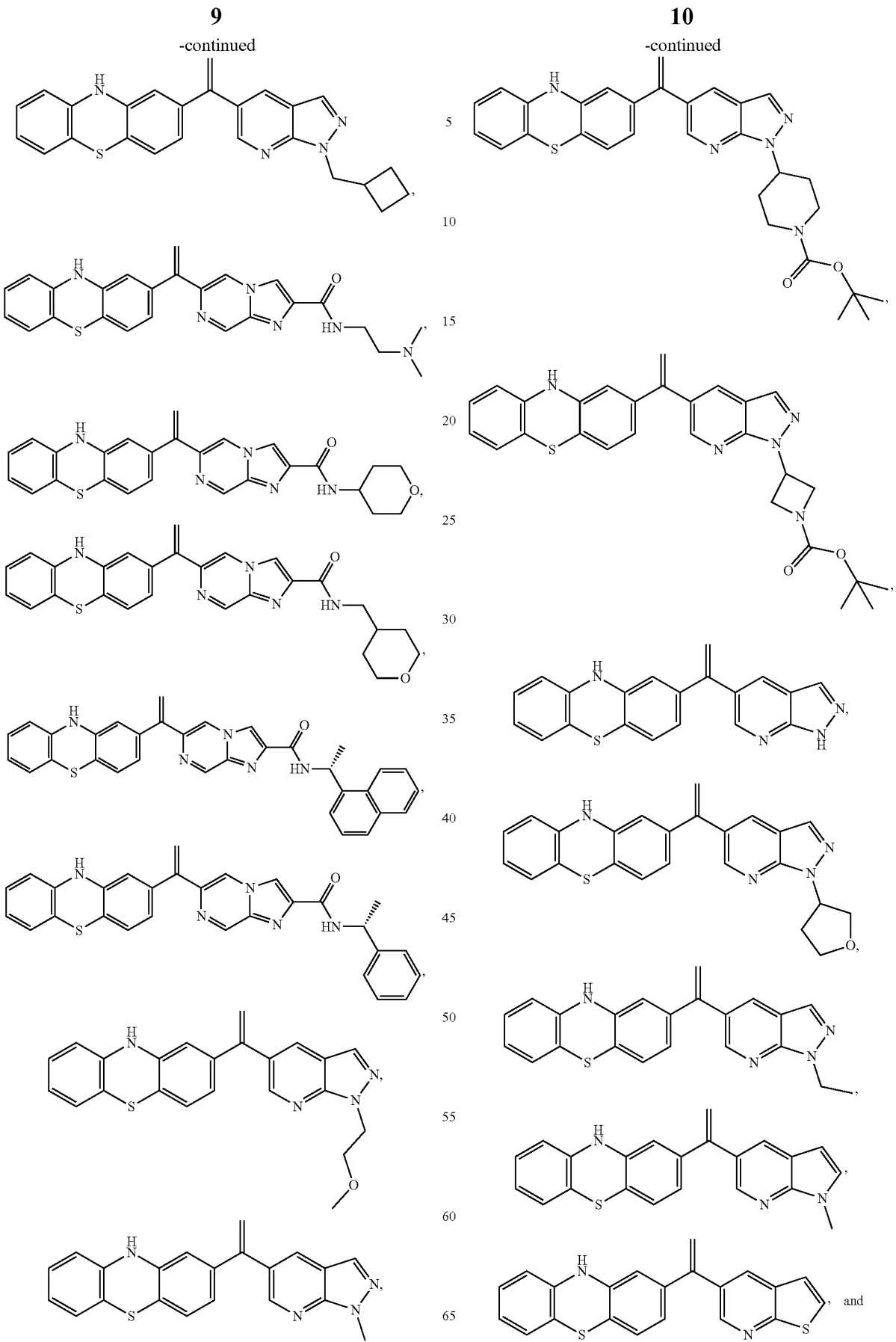

-continued

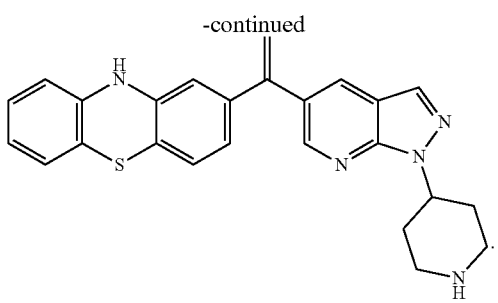

The present disclosure also provides use of the aforementioned compound, a salt thereof, or a stereoisomer thereof in in the preparation of a ferroptosis inhibitor; and the ferroptosis inhibitor can be used as a targeted drug for inhibiting cell ferroptosis.

The present disclosure also provides the aforementioned compound, a salt thereof, or a stereoisomer thereof in the manufacture of a medicament for treating or preventing of a neurodegenerative disease, tumor, tissue ischemia-reperfusion injury, cerebral stroke, cardiovascular disease, renal failure or diabetic complication; preferably, the neurodegenerative disease is selected from Alzheimer's disease and Parkinson's disease.

The present disclosure also provides a pharmaceutical composition comprising the aforementioned compound, a salt thereof, or a stereoisomer thereof as an active ingredient, and optionally a pharmaceutically acceptable auxiliary; preferably, the pharmaceutical composition is in the form of an oral preparation or an intravenous injection preparation. The "pharmaceutically acceptable auxiliary" comprises a pharmaceutically acceptable carrier or excipient.

The compounds and derivatives provided in the present disclosure may be named according to the IUPAC (International Union of Pure and Applied Chemistry) or CAS (Chemical Abstracts Service, Columbus, OH) nomenclature system.

Definition of terms used in the present disclosure: Unless otherwise stated, the initial definition of a group or term provided herein applies to the group or term used throughout the specification; terms not specifically defined herein should be given a meaning that can be determined by those skilled in the art based on the disclosure and context.

"Substitution" refers to the replacement of a hydrogen atom in a molecule with a different atom or atom group.

The structures of the compounds described in the present disclosure all refer to structures that can exist stably.

The structural formula of the substituent "—C(O)NR$_3$R$_4$" of the present disclosure is

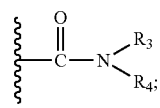

the structural formula of the substituent "—C(O)R$_5$" of the present disclosure is

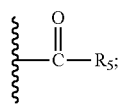

the structural formula of the substituent "—C(O)OR$_5$" of the present disclosure is

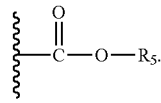

The minimum and maximum carbon atom number in a hydrocarbon group is indicated by a prefix. For example, a prefixed alkyl ($C_a$~$C_b$) indicates any alkyl group containing "a" to "b" carbon atoms. Thus, for example, $C_1$~$C_8$ alkyl refers to a straight or branched alkyl group containing 1~8 carbon atoms; $C_1$~$C_8$ alkoxy refers to an alkoxy group containing 1~8 carbon atoms. The alkyl group in the present disclosure is preferably $C_1$~$C_8$ alkyl, more preferably $C_1$~$C_6$ alkyl, and particularly preferably $C_1$~$C_4$ alkyl or $C_1$~$C_2$ alkyl. Similarly, the alkoxy group in the present disclosure is preferably $C_1$~$C_8$ alkoxy, more preferably $C_1$~$C_6$ alkoxy, and particularly preferably $C_1$~$C_4$ alkoxy or $C_1$~$C_2$ alkoxy.

In the present disclosure, 3- to 8-membered saturated cycloalkyl refers to a monocyclic or polycyclic cycloalkyl group consisting of 3-8 carbon atoms, in which the cycloalkyl group has no double bonds. 3- to 10-membered unsaturated cycloalkyl refers to a monocyclic or polycyclic cycloalkyl group consisting of 3-10 carbon atoms, in which the cycloalkyl group contains one or more double bonds. 3- to 8-membered saturated heterocyclyl refers to a saturated monocyclic heterocyclyl without double bonds, in which the heterocyclyl carries at least one ring atom selected from O, S and substituted nitrogen atom, and the remaining ring atoms are carbon. 3- to 8-membered unsaturated heterocyclyl refers to monocyclic heterocyclyl with a double bond, in which the heterocyclyl carries at least one ring atom selected from O, S and substituted nitrogen atom, and the remaining ring atoms are carbon.

In the present disclosure, the halogen is selected from fluorine, chlorine, bromine and iodine.

The present disclosure synthesizes a new phenothiazine compound, which has a good inhibitory effect on ferroptosis and can be used for preparing ferroptosis inhibitor. It can also be used in the manufacture of a medicament for treating neurodegenerative diseases such as Alzheimer's disease and Parkinson's disease, cerebral stroke such as hemorrhagic cerebral stroke and ischemic cerebral stroke, and ferroptosis-related diseases such as tumor, tissue ischemia-reperfusion injury, cardiovascular disease, cerebrovascular disease, renal failure and diabetic complications. Meanwhile, the phenothiazine compound synthesized in the present disclosure has good cardiac safety, and has broad market prospects.

Obviously, according to the above content of the present disclosure, in accordance with the ordinary technical knowledge and conventional means in the art, other various forms of modification, replacement or alteration can be made without departing from the above basic technical idea of the present disclosure.

BRIEF DESCRIPTION OF DRAWINGS

FIG. 1 shows the therapeutic effect of the compounds of the present disclosure on ischemic cerebral stroke in SD rats of the rat middle cerebral artery embolism (MCAO) cerebral stroke model, where FIG. A shows the anatomical photos of the rat brain after different treatments, FIG. B shows the effect of different treatments on the volume of cerebral infarction (in FIG. B, * means p<0.05; *** means p<0.001), and FIG. C shows the neurological function score (Longa neurological score with 5 points) after the intravenous injection of 5 mg/kg dose of different treatments.

The above content of the present disclosure will be further described in detail below through specific implementations in the form of examples. However, it should not be understood that the scope of the above subject matter of the present disclosure is limited to the following examples. All technologies implemented based on the above contents of the present disclosure belong to the scope of the present disclosure.

DETAILED DESCRIPTION

The raw materials and equipment used in the specific embodiments of the present disclosure are known products, and obtained by purchasing commercially available products.

Example 1 Synthesis of 2-(1-(1-(azetidine-3-amino)-1H pyrazolo[3,4-b]pyridin-5-yl)vinyl)-10H phenothiazine (compound 1)

1. Synthesis of (E)-N'-(1-(10H-phenothiazin-2-yl)ethylene)-4-methylbenzenesulfonylhydrazide (Intermediate I)

The synthetic route of intermediate I is as follows:

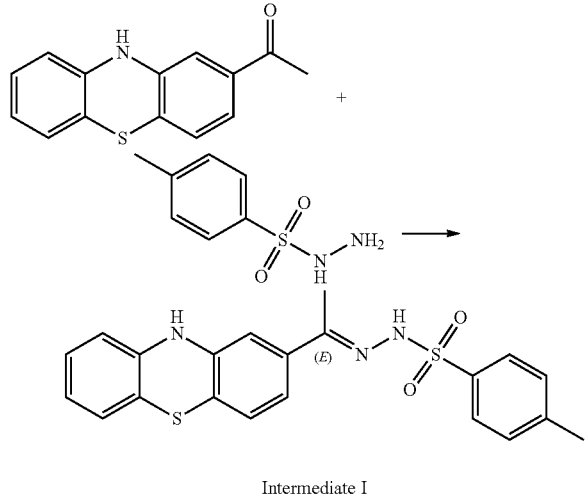

2-Acetylphenothiazine (10.0 g, 41.44 mmol, 1.0 eq) and 4-methylbenzenesulfonylhydrazide (7.72 g, 41.44 mmol, 1.0 eq) were dissolved in 100 mL of MeOH, added with 1 mL of HOAc, and reacted at 60° C. The reaction was monitored by TLC and completed after about 4 h. After cooling to room temperature, a yellow solid appeared. The system was filtered under reduced pressure, washed with MeOH and diethyl ether until the filtrate was colorless, and dried in vacuum to obtain Intermediate I (15 g) with a yield of 88.4%.

2. Synthesis of Intermediate II

The synthetic route of intermediate II is as follows:

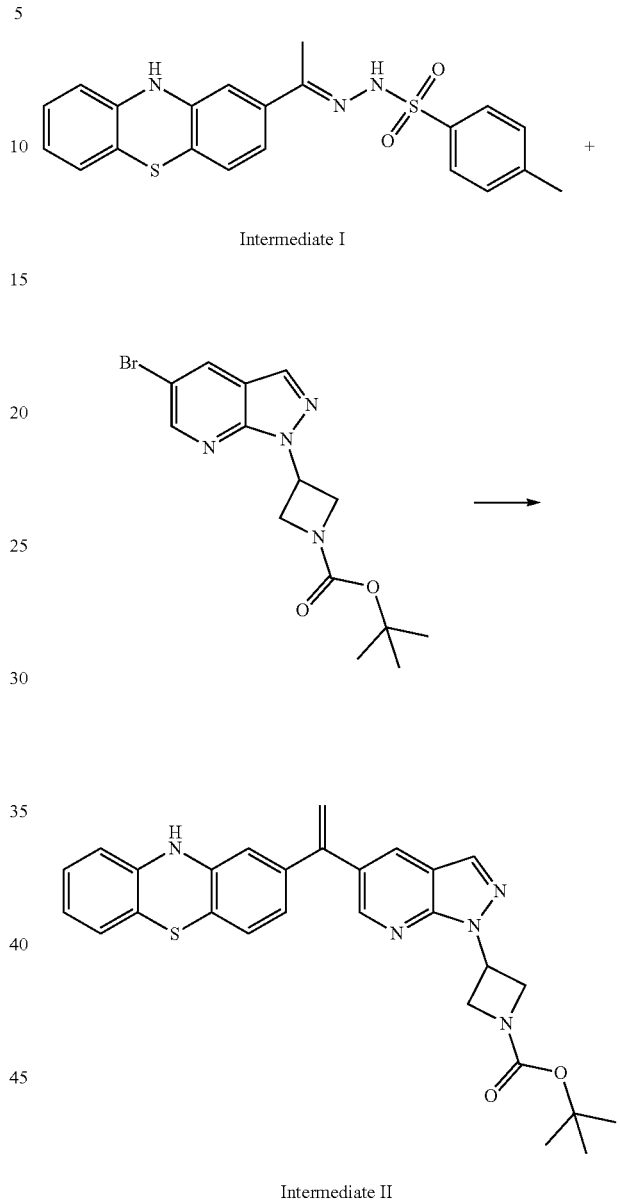

Intermediate I (120 mg, 0.293 mmol, 1.2 eq), tert-butyl 3-(5-bromo-1H-pyrazolin[3,4-B]pyridin-1-yl)azelate (86 mg, 0.244 mmol, 1.0 eq), tris(dibenzylidene-BASE acetone) dipalladium(0)Pd$_2$(dpa)$_3$ (24 mg, 0.03 mmol, 0.1 eq), 2-dicyclohexylphosphorus-2,4,6-triisopropylbiphenyl X-phos (25 mg, 0.03 mmol, 0.2 eq) and anhydrous t-BuOLi (43 mg, 0.537 mmol, 2.2 eq) were dissolved in 10 mL of 1,4-dioxane replaced with argon 3 times, and reacted at 70° C. The reaction was monitored by TLC and completed after about 4 h. The system was cooled to room temperature, filtered through celite, and concentrated under reduced pressure. The residue was extracted with saturated aqueous NaHCO$_3$ solution/DCM. The organic layer was concentrated and separated by column chromatography to obtain Intermediate II (91 mg) with a yield of 55.3%.

3. Synthesis of Compound 1

The synthetic route of compound 1 is as follows:

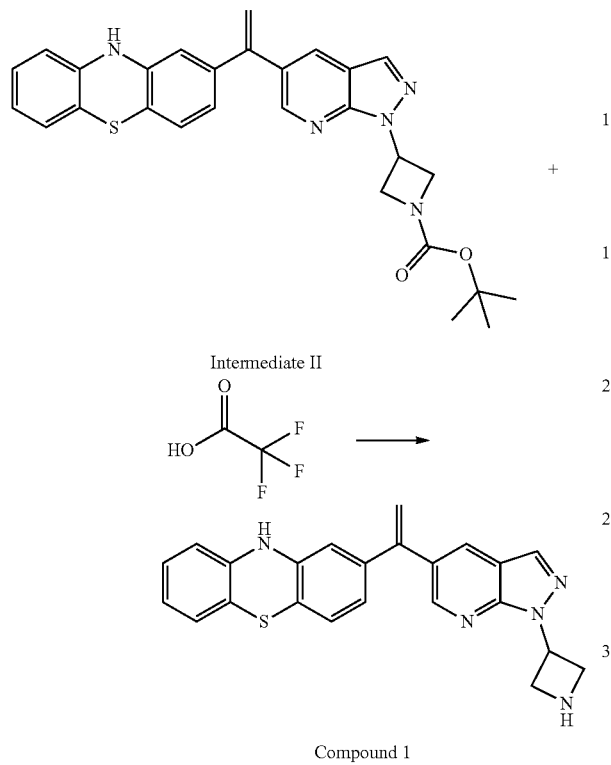

Intermediate II

Compound 1

91 mg of intermediate II was added with 2 mL of dichloromethane and 3 mL of trifluoroacetic acid, reacted at room temperature for half an hour. The resultant was rotated to dryness, dissolved in DCM, and purified by TLC with PE:EA=1:1 as the developing solvent, and separated to obtain the target product compound 1 (67 mg) with a yield of 91.2%.

$^1$H NMR and HRMS data of compound 1 are as follows:
$^1$H NMR (400 MHz, DMSO) δ 8.61 (s, 1H), 8.55 (d, J=1.8 Hz, 1H), 8.38 (s, 1H), 8.19 (d, J=1.8 Hz, 1H), 6.95 (dt, J=15.5, 7.4 Hz, 3H), 6.79-6.71 (m, 2H), 6.63 (d, J=7.7 Hz, 2H), 6.04-5.97 (m, 1H), 5.60 (s, 1H), 5.51 (s, 1H), 4.53 (dd, J=13.8, 6.9 Hz, 4H), 4.49-4.42 (M, 1H).
HRMS (ESL) calcd for $C_{23}H_{19}N_5S$ [M+H]$^+$ 398.1361 found; 398.1363.

Example 2 Synthesis of Compound 2

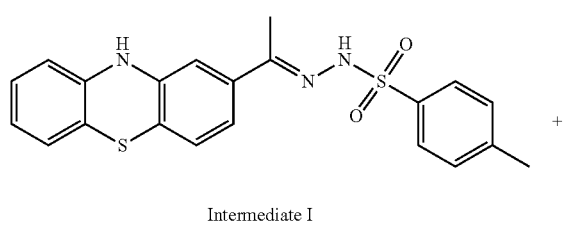

Intermediate I

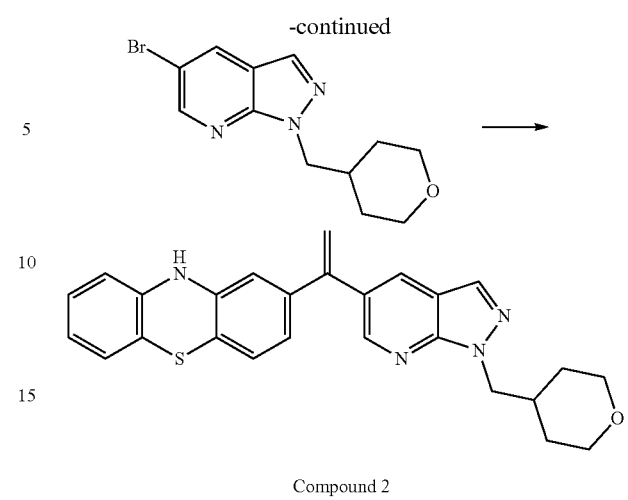

Compound 2

Compound 2 was prepared by a synthetic method similar to that of Example 1 with a yield of 36.4%.

$^1$H NMR and HRMS data of compound 2 are as follows:
$^1$H NMR (400 MHz, DMSO) δ 8.54 (t, J=5.4 Hz, 2H), 8.16 (s, 1H), 8.11 (s, 1H), 7.03-6.88 (m, 3H), 6.86-6.69 (m, 2H), 6.60 (d, J=9.1 Hz, 2H), 5.57 (s, 1H), 5.50 (s, 1H), 4.38 (d, J=7.0 Hz, 2H), 3.82 (d, J=9.1 Hz, 2H), 3.25 (t, J=10.7 Hz, 2H), 2.23 (ddd, J=10.9, 7.6, 3.9 Hz, 1H), 1.38-1.20 (M, 4H).
HRMS m/z, (ESI) calcd for $C_{26}H_{24}N_4OS$ [M+H]$^+$ 441.1671 found: 441.1673.

Example 3 Synthesis of Compound 3

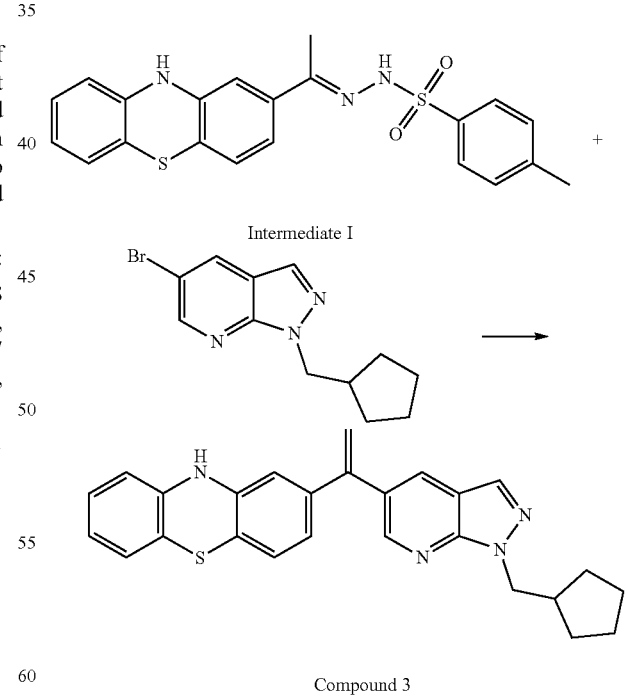

Compound 3

Compound 3 was prepared by a synthetic method similar to that of Example 1 with a yield of 45.1%.

$^1$H NMR and HRMS data of compound 3 are as follows:
$^1$H NMR (400 MHz, DMSO) δ 8.58-8.47 (m, 2H), 8.15 (s, 1H), 8.10 (d, J=2.0 Hz, 1H), 6.95 (dt, J=17.5, 5.4 Hz, 3H), 6.81 (dd, J=8.0, 1.7 Hz, 1H), 6.75 (td, J=7.6, 1.1 Hz, 1H), 6.60 (dd, J=10.4, 1.4 Hz, 2H), 5.57 (s, 1H), 5.50 (s, 1H), 4.39 (d, J=7.5 Hz, 2H), 1.63-1.60 (m, 2H), 1.51 (td, J=7.9, 2.8 Hz, 2H), 1.37-1.29 (m, 2H), 1.24 (d, J=6.9 Hz, 2H), 1.16 (d, J=6.7 Hz, 1H).

HRMS m/z, (ESI) calcd for $C_{26}H_{24}N_4S$ [M+H]$^+$ 425.1722 found: 425.1725.

Example 4 Synthesis of Compound 4

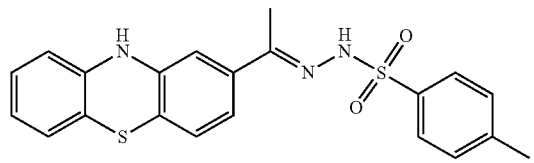

Intermediate I

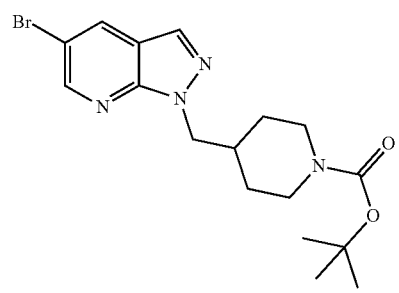

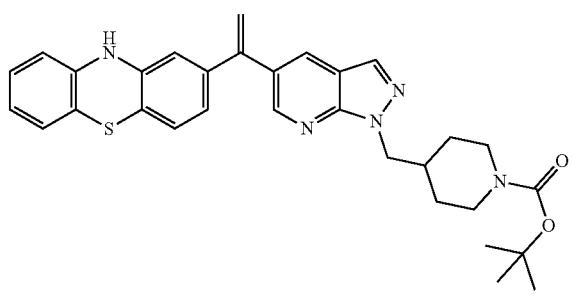

Compound 4

Compound 4 was prepared by a synthetic method similar to that of Example 1 with a yield of 39.5%.

$^1$H NMR and HRMS data of compound 4 are as follows:

$^1$H NMR (400 MHz, DMSO) δ 8.57-8.49 (m, 2H), 8.16 (s, 1H), 8.11 (d, J=2.1 Hz, 1H), 6.94 (ddd, J=10.4, 8.2, 1.1 Hz, 3H), 6.83-6.72 (m, 2H), 6.60 (dd, J=9.6, 1.4 Hz, 2H), 5.57 (s, 1H), 5.50 (s, 1H), 4.38 (d. J=7.0 Hz, 2H), 3.91 (d, J=12.4 Hz, 2H), 2.74-2.57 (m, 2H), 2.17 (ddd, J=14.9, 9.5, 3.9 Hz, 1H), 1.54-1.44 (m, 2H), 1.39 (d, J=6.8 Hz, 9H), 1.20-1.10 (m, 2H).

HRMS m/z (ESI) calcd for $C_{31}H_{33}N_5O_2S$ [M+H]$^+$ 540.2355 found: 540.2357.

Example 5 Synthesis of Compound 5

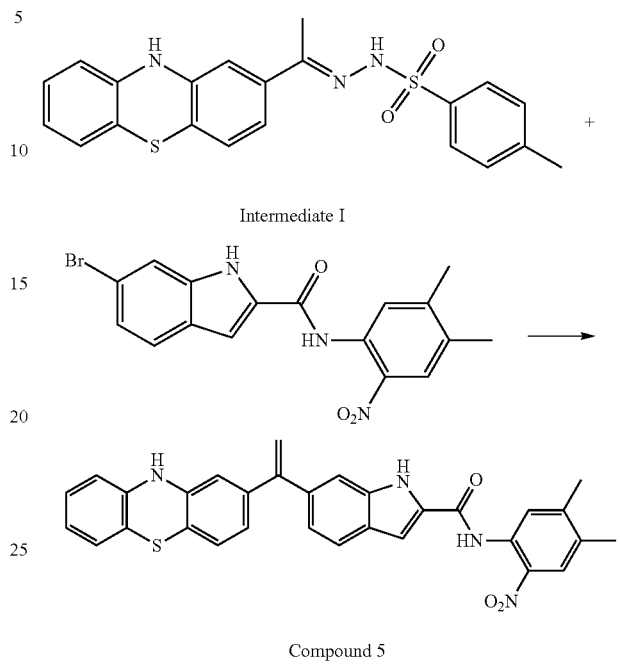

Intermediate I

Compound 5

Compound 5 was prepared by a synthetic method similar to that of Example 1 with a yield of 52.1%.

$^1$H NMR and HRMS data of compound 5 are as follows:

$^1$H NMR (400 MHz, DMSO) δ 11.33 (s, 1H) 8.55 (s, 1H), 7.86 (s, 1H), 7.47 (s, 1H), 7.38 (d, J=8.5 Hz, 2H), 7.11 (dd, J=19.7, 11.2 Hz, 2H), 6.97 (d, J=7.8 Hz, 1H), 6.91 (d, J=7.7 Hz, 2H), 6.84-6.70 (m, 3H), 6.61 (d, J=5.6 Hz, 2H), 5.33 (s, 1H), 5.32 (s, 1H), 1.23 (s, 6H).

HRMS m/z. (ESI) calcd for C31H24N4O3S [M+H]+ 533.1509 found: 533.1571.

Example 6 Synthesis of Compound 6

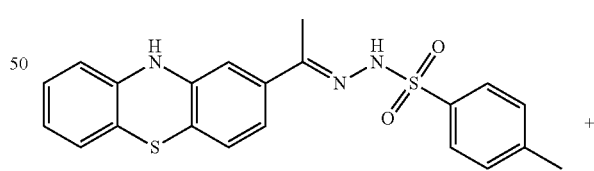

Intermediate I

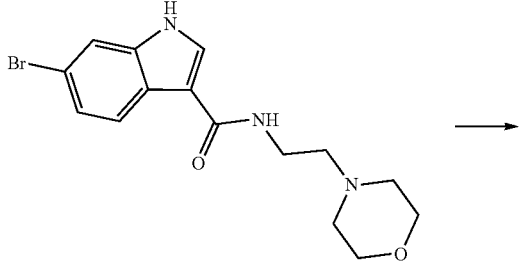

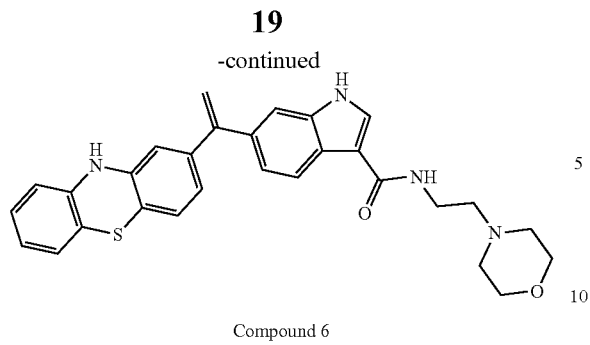

Compound 6

Compound 6 was prepared by a synthetic method similar to that of Example 1 with a yield of 53.5%.

¹H NMR and HRMS data of compound 6 are as follows:

¹H NMR (400 MHz, DMSO) δ 11.61 (s, 1H), 8.52 (s, 1H), 8.41 (t, J=5.7 Hz, 1H), 7.53 (s, 1H) 7.40 (t, J=6.0 Hz, 1H) 7.13 (dd, J=8.5, 1.5 Hz, 1H), 7.08 (d, J=1.2 Hz, 1H), 6.99-6.88 (m, 3H), 6.81-6.71. (m, 2H), 6.63-6.56 (m, 2H), 5.36 (s, 1H). 5.35 (s, 1H), 3.63-3.53 (m, 5H), 3.44-3.39 (m, 2H), 2.43 (s, 5H).

HRMS m/z (ESI) calcd for $C_{29}H_{28}N_4O_2S$ [M+H]⁺ 497.1933 found: 497.1935.

Example 7 Synthesis of Compound 7

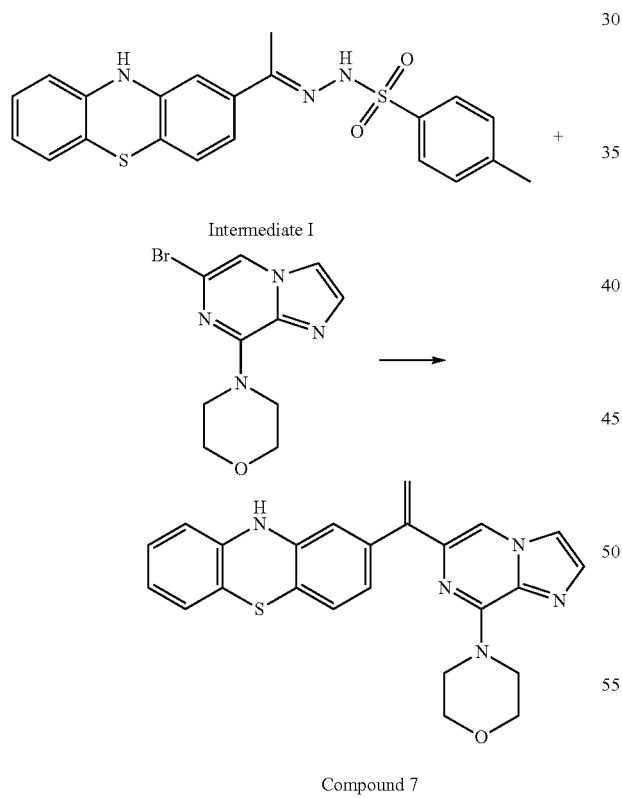

Compound 7

Compound 7 was prepared by a synthetic method similar to that of Example 1 with a yield of 54.2%.

¹H NMR and HRMS data of compound 7 are as follows:

¹H NMR (400 MHz, DMSO) δ 8.61 (s, 1H) 7.97 (d, J=0.8 Hz, 1H), 7.77 (s, 1H), 7.52 (d, J=0.8 Hz, 1H), 6.97 (ddd, J=19.1, 11.7, 4.0 Hz, 3H), 6.85-6.73 (m, 2H), 6.71 (d, J=1.6 Hz, 1H), 6.66 (d, J=7.9 Hz, 1H), 6.01 (d, J=2.0 Hz, 1H), 5.32 (d, J=2.0 Hz, 1H), 4.32-4.14 (m, 4H), 3.85-3.68 (m, 4H).

HRMS m/z (ESI) calcd for $C_{24}H_{21}N_5OS$ [M+H]⁺ 428.1467 found: 428.1469.

Example 8 Synthesis of Compound 8

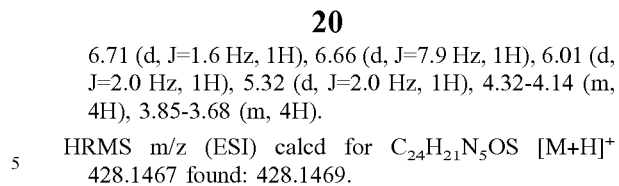

Intermediate I

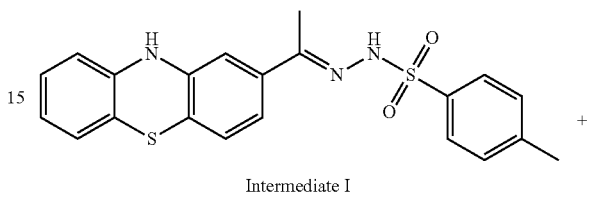

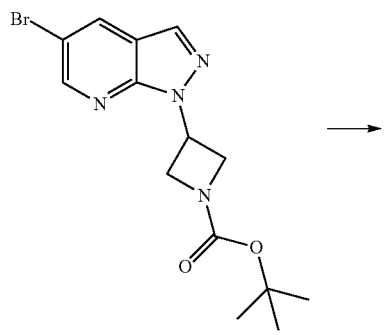

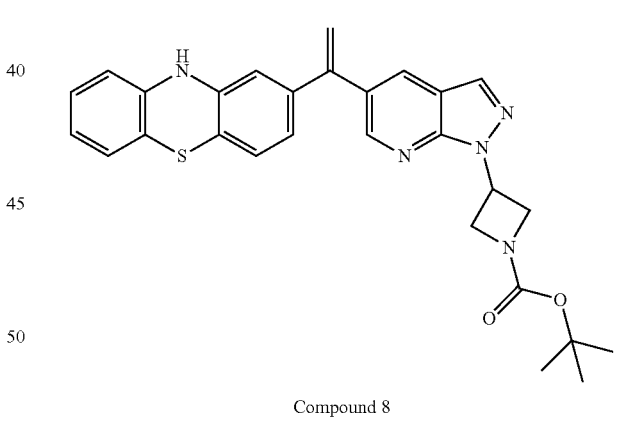

Compound 8

Compound 8 was prepared by a synthetic method similar to that of Example 1 with a yield of 58.4%.

¹H NMR and HRMS data of compound 8 are as follows:

¹H NMR (400 MHz, DMSO) δ 8.52 (d, J=2.0 Hz 2H), 8.30 (s, 1H), 8.16 (d, J=2.1 Hz, 1H), 6.95 (ddd, J=17.8, 8.8, 1.2 Hz, 3H), 6.80 (dd, J=8.0, 1.8 Hz, 1H), 6.75 (td, J=7.6, 1.2 Hz, 1H), 6.62-6.54 (m, 2H), 5.82 (tt, J=8.1, 5.5 Hz, 1H), 5.60 (s, 1H), 5.49 (s, 1H), 4.39 (dd, J=30.0, 21.9 Hz, 4H), 1.43 (s, 9H)

HRMS m/z (ESI) calcd for $C_{28}H_{27}N_5O_2S$ [M+H]⁺ 498.1885 found: 498.1887.

Example 9 Synthesis of Compound 9

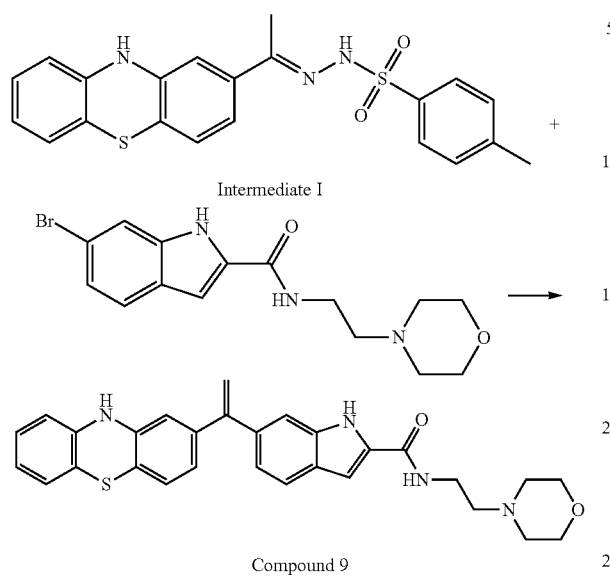

Compound 9

Compound 9 was prepared by a synthetic method similar to that of Example 1 with a yield of 52.8%.

$^1$H NMR and HRMS data of compound 9 are as follows:
$^1$H NMR (400 MHz, DMSO) δ 11.48 (s, 1H), 8.53 (s, 1H), 8.10 (d, J=7.8. Hz, 1H), 7.99 (s, 1H), 7.79 (s, 1H), 7.29 (s, 1H) 7.13 (d, J=7.8 Hz, 1H), 7.05-6.85 (m, 3H), 6.85-6.70 (m, 2H) 6.61 (s, 2H), 5.42 (s 1H), 5.38 (s, 1H), 3.58 (s, 4H), 3.39 (d, J=5.2 Hz, 2H), 2.45 (d, J=15.9 Hz, 6H).

HRMS m/z (ESI) calcd for C29H28N4O2S [M+H]+ 497.1933 found: 497.1933.

Example 10 Synthesis of Compound 10

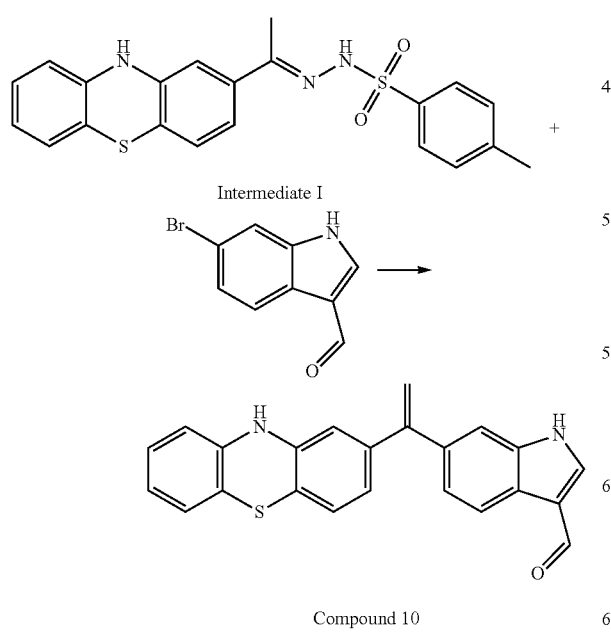

Compound 10

Compound 10 was prepared by a synthetic method similar to that of Example 1 with a yield of 55.1%.

$^1$H NMR and HRMS data of compound 10 are as follows:
$^1$H NMR (400 MHz, DMSO) δ 12.07 (s, 1H), 9.95 (s, 1H), 8.53 (s, 1H), 8.31 (s, 1H), 8.05 (dd, J=20.0, 8.3 Hz, 1H) 7.42-7.34 (m, 1H), 7.24 (d, J=8.2 Hz, 1H), 7.09-6.87 (m, 3H), 6.81 (dd, J=7.9, 1.4 Hz, 1H), 5.75 (t, J=7.4 Hz, 1H), 6.60 (d, J=7.4 Hz, 2H), 5.44 (s, 2H).

HRMS m/z (ESI) calcd for C23H16N2OS [M+H]+ 369.0983 found: 369.0985.

Example 11 Synthesis of Compound 11

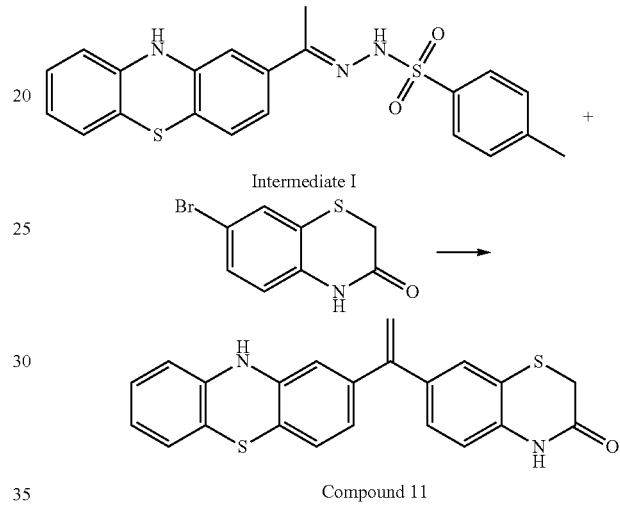

Compound 11

Compound 11 was prepared by a synthetic method similar to that of Example 1 with a yield of 46.3%.

$^1$H NMR and HRMS data of compound 11 are as follows:
$^1$H NMR (400 MHz, DMSO) δ 10.64 (s, 1H), 8.56 (s, 1H), 7.23 (d, J=1.9 Hz, 1H), 7.10 (dd, J=8.3, 2.0 Hz, 1H), 6.97 (ddd, J=7.9, 4.2, 1.4 Hz, 2H), 6.91 (d, J=7.9 Hz, 2H), 6.78-6.71 (m, 2H), 6.62 (dd, J=7.9, 0.8 Hz, 1H), 6.57 (d, J=1.7 Hz, 1H), 5.37 (s 2H), 3.48 (s, 2H).

HRMS m/z (ESI) calcd for C22H16N2OS [M+H]+ 389.0704 found: 389.0706.

Example 12 Synthesis of Compound 12

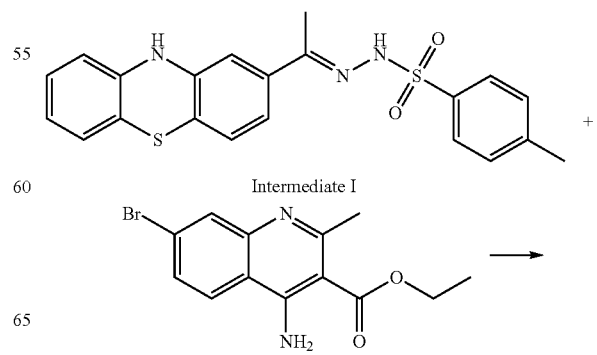

-continued

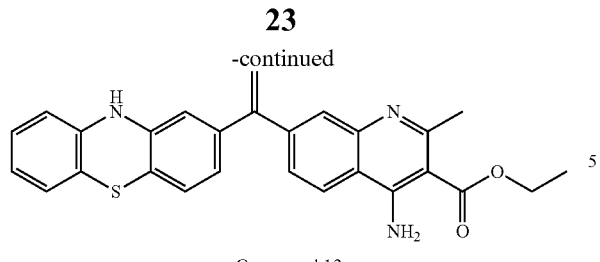

Compound 12

Compound 12 was prepared by a synthetic method similar to that of Example 1 with a yield of 48.6%.

$^1$H NMR and HRMS data of compound 12 are as follows:

$^1$H NMR (400 MHz, DMSO) δ 8.56 (s, 1H), 8.29 (d, J=8.7 Hz, 1H), 7.80 (s, 2H), 7.56 (d, J=1.6 Hz, 1H), 7.40 (dd, J=8.6, 1.7 Hz, 1H), 7.04-6.88 (m, 3H), 6.86-6.70 (m, 2H), 6.61 (dd, J=9.6, 1.2 Hz, 2H), 5.63 (s, 1H), 5.57 (s, 1H), 4.36 (q, J=7.1 Hz, 2H), 2.62 (s, 3H), 1.36 (t, J=7.1 Hz, 3H).

HRMS m/z (ESI) calcd for $C_{27}H_{23}N_3O_2S$ [M+H]$^+$ 454.1511 found: 454.1513.

Example 13 Synthesis of Compound 13

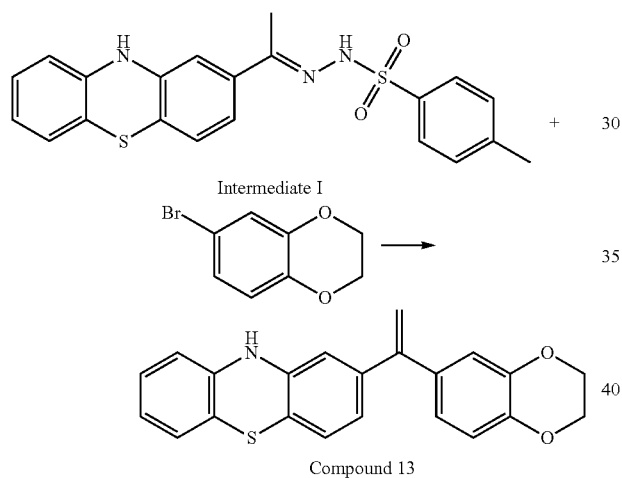

Intermediate I

Compound 13

Compound 13 was prepared by a synthetic method similar to that of Example 1 with a yield of 49.6%.

$^1$H NMR and HRMS data of compound 13 are as follows:

$^1$H NMR (400 MHz, DMSO) δ 8.56 (s, 1H), 6.97 (td, J=7.8, 1.4 Hz, 1H), 6.94-6.88 (m, 2H), 6.88-6.82 (m, 1H), 6.77 (d, J=1.8 Hz, 2H), 6.75 (d, J=2.0 Hz, 1H), 6.72 (d, J=1.7 Hz, 1H), 6.63 (dd, J=7.9, 0.9 Hz, 1H), 6.59 (d, J=1.7 Hz, 1H), 5.31 (s, 2H), 4.25 (s, 4H).

HRMS m/z (ESI) calcd for $C_{22}H_{17}NO_2S$ [M+H]$^+$ 360.0980 found: 360.0982.

Example 14 Synthesis of Compound 14

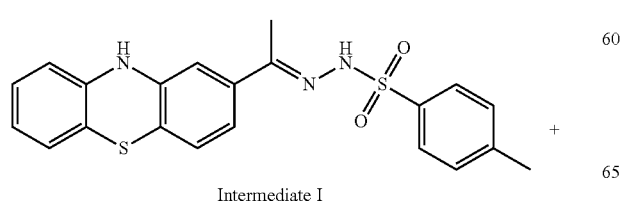

Intermediate I

-continued

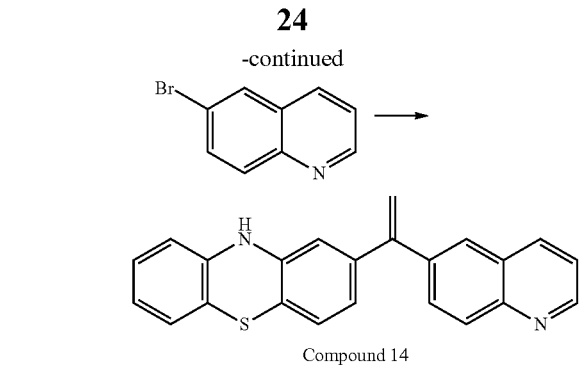

Compound 14

Compound 14 was prepared by a synthetic method similar to that of Example 1 with a yield of 52.6%.

$^1$H NMR and HRMS data of compound 14 are as follows:

$^1$H NMR (400 MHZ, DMSO) δ 8.90 (dd, J=4.2, 1.6 Hz, 1H), 8.54 (s, 1H), 8.40 (d, J=7.7 Hz, 1H), 8.02 (d, J=8.7 Hz, 1H), 7.90 (d, J=1.8 Hz, 1H) 7.72 (dd, J=8.7, 2.0 Hz, 1H) 7.54 (dd, J=8.3, 4.2 Hz, 1H), 7.02-6.88 (m, 3H), 6.83 (dd, J=7.9, 1.8 Hz, 1H), 6.75 (td, J=7.6, 1.1 Hz, 1H), 6.60 (dd, J=4.2, 2.5 Hz, 2H), 5.60 (s, 1H), 5.58 (s, 1H).

HRMS m/z (ESI) calcd for $C_{23}H_{16}N_2S$ [M+H]$^+$ 353.1034 found: 353.1036.

Example 15 Synthesis of Compound 15

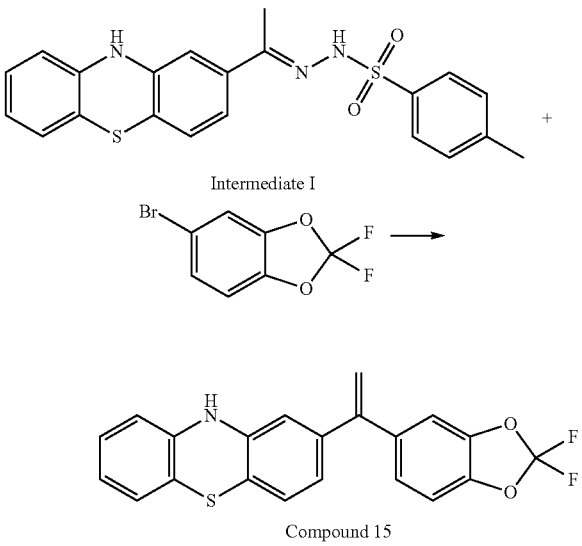

Intermediate I

Compound 15

Compound 15 was prepared by a synthetic method similar to that of Example 1 with a yield of 51.3%.

$^1$H NMR and HRMS data of compound 15 are as follows:

$^1$H NMR (400 MHz, DMSO) δ 8.56 (s, 1H), 7.39 (dd, J=12.2, 5.0 Hz, 2H), 7.11 (dd, J=8.3, 1.5 Hz, 1H), 6.97 (dd, J=10.9, 4.3 Hz, 1H), 6.92 (dd, J=7.4, 3.7 Hz, 2H), 6.78-6.72 (m, 2H), 6.63 (d, J=7.8 Hz, 1H), 6.56 (d, J=1.7 Hz, 1H), 5.48 (s, 1H), 5.43 (s, 1H).

HRMS m/z (ESI) calcd for $C_{21}H_{13}F_2NO_2S$ [M+H]$^+$ 382.0635 found: 382.0637.

Example 16 Synthesis of Compound 16

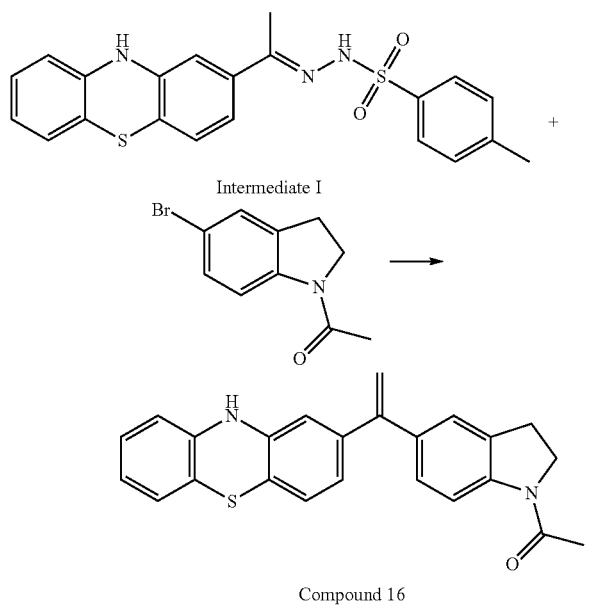

Compound 16

Compound 16 was prepared by a synthetic method similar to that of Example 1 with a yield of 49.4%.

¹H NMR and HRMS data of compound 16 are as follows:
¹H NMR (400 MHz, DMSO) δ 8.55 (s, 1H) 8.01 (d, J=8.3 Hz, 1H), 7.15 (s, 1H), 7.09 (d, J=8.3 Hz, 1H), 6.97 (td, J=7.7, 1.4 Hz, 1H), 6.93-6.87 (m, 2H), 6.79-6.70 (m, 2H), 6.63 (dd, J=7.9, 0.9 Hz, 1H), 6.58 (d, J=1.7 Hz, 1H) 5.33 (s, 1H), 5.33 (s, 1H), 4.09 (dd, J=14.2, 5.7 Hz, 2H), 3.19-3.06 (m, 2H), 2.16 (s, 3H),
HRMS m/z (ESI) calcd for $C_{24}H_{20}N_2OS$ $[M+H]^+$ 385.1296 found: 385.1298.

Example 17 Synthesis of Compound 17

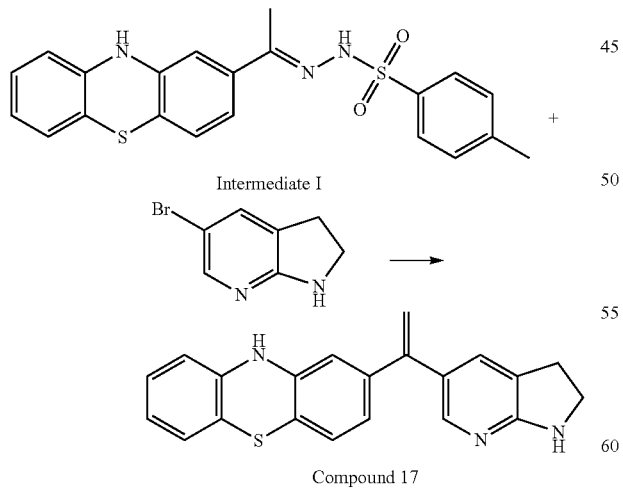

Compound 17

Compound 17 was prepared by a synthetic method similar to that of Example 1 with a yield of 48.5%.

¹H NMR and HRMS data of compound 17 are as follows:
¹H NMR (400 MHz, DMSO) δ 8.56 (s, 1H), 7.62 (d, J=1.5 Hz, 1H), 7.16 (s, 1H), 6.97 (dd, J=11.0, 4.3 Hz, 1H) 6.90 (dd, J=7.4, 3.9 Hz, 2H), 6.80-6.71 (m, 2H), 6.61 (dd, J=12.1, 4.5 Hz, 2H), 6.53 (s, 1H), 5.24 (s, 1H), 5.19 (s, 1H), 3.49 (t, J=8.4 Hz, 2H), 2.96 (t, J=8.3 Hz, 2H).
HRMS m/z (ESI) calcd for $C_{21}H_{17}N_3S$ $[M+H]^+$ 344.1143 found: 344.1145.

Example 18 Synthesis of Compound 18

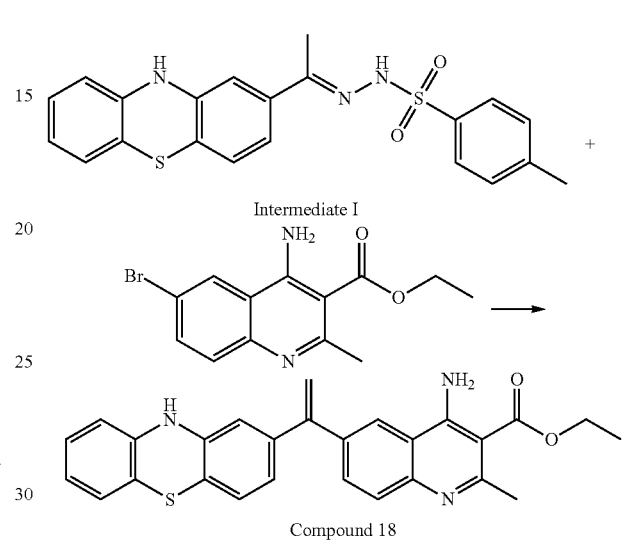

Compound 18

Compound 18 was prepared by a synthetic method similar to that of Example 1 with a yield of 50.9%.

¹H NMR and HRMS data of compound 18 are as follows:
¹H NMR (400 MHz, DMSO) δ 8.55 (s, 1H), 8.29 (s, 1H), 7.82 (s, 2H), 7.68 (d, J=8.6 Hz, 1H), 7.52 (dd, J=8.6, 1.5 Hz, 1H), 7.03-6.87 (m, 3H), 6.78 (ddd, J=15.0, 11.0, 4.5 Hz, 2H), 6.61 (d, J=8.5 Hz, 2H), 5.56 (s, 1H), 5.52 (s, 1H), 4.36 (q, J=7.1 Hz, 2H), 2.64 (s, 3H) 1.35 (t, J=7.1 Hz, 3H).
HRMS m/z (ESI) calcd for C27H23N3O2S [M+H]+ 454.1511 found: 454.1513.

Example 19 Synthesis of Compound 19

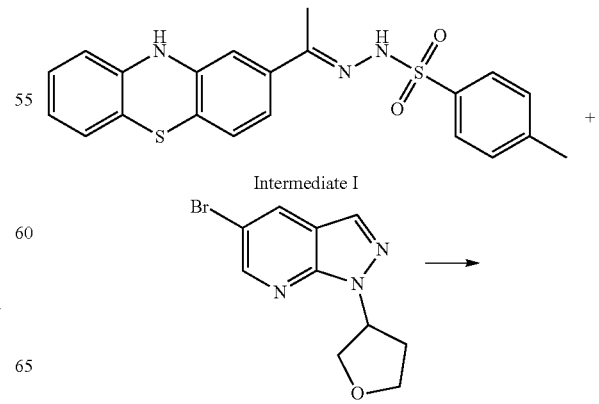

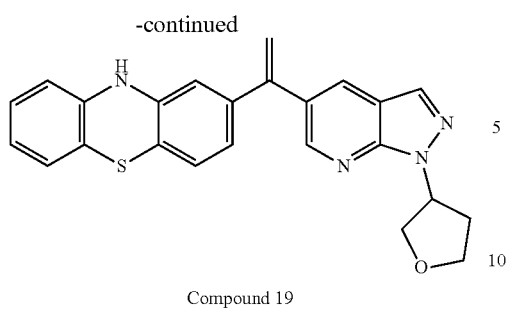

Compound 19

Compound 19 was prepared by a synthetic method similar to that of Example 1 with a yield of 49.9%.

¹H NMR and HRMS data of compound 19 are as follows:
¹H NMR (400 MHz, DMSO) δ 8.55-8.50 (m, 2H), 8.20 (s, 1H), 8.13 (d, J=2.0 Hz, 1H), 7.00-6.89 (m, 3H), 6.82 (dd, J=8.0, 1.8 Hz, 1H), 6.75 (td, J=7.6, 1.0 Hz, 1H), 6.64-6.55 (m, 2H), 5.71-5.61 (m, 1H), 5.59 (s, 1H), 5.49 (s, 1H), 4.13 (ddd, J=22.8, 12.1, 7.2 Hz, 2H), 3.94 (ddd, J=14.3, 6.2, 3.9 Hz, 2H), 2.49-2.38 (m, 2H).
HRMS m/z (ESI) calcd for C24H20N4OS [M+H]+ 413.1358 found: 413.1360.

Example 20 Synthesis of Compound 20

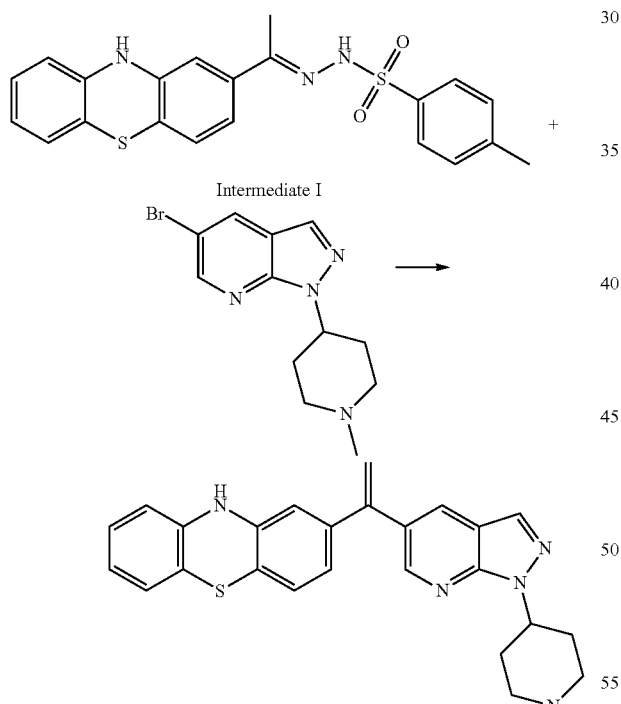

Compound 20

Compound 20 was prepared by a synthetic method similar to that of Example 1 with a yield of 41.2%.

¹H NMR and HRMS data of compound 20 are as follows:
¹H NMR (400 MHz, DMSO) δ 8.60-8.41 (m, 2H), 8.17 (s, 1H), 8.11 (d, J=1.9 Hz, 1H), 6.94 (dt, J=18.3, 9.1 Hz, 3H) 6.83 (dd, J=7.9, 1.6 Hz, 1H), 6.75 (t, J=7.5 Hz, 1H), 6.58 (dd, J=7.3, 4.8 Hz, 2H), 5.58 (s, 1H), 5.48 (s, 1H), 4.80 (ddd, J=15.1, 9.6, 3.9 Hz 1H), 2.93 (d, J=10.8 Hz, 2H), 2.25 (s, 3H), 2.23-1.98 (m, 4H), 1.90 (d, J=10.8 Hz, 2H).
HRMS m/z (ESI) calcd for C26H25N5S [M+H]+ 440.1831 found: 440.1833.

Example 21 Synthesis of Compound 21

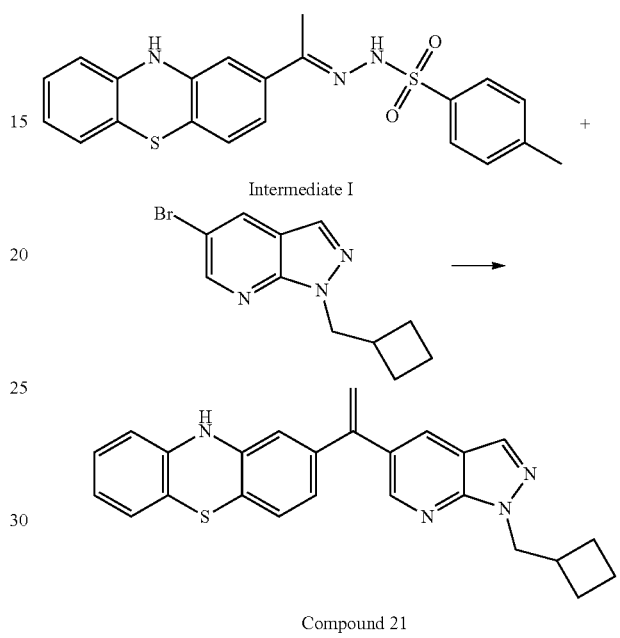

Compound 21

Compound 21 was prepared by a synthetic method similar to that of Example 1 with a yield of 46.5%.

¹H NMR and HRMS data of compound 21 are as follows:
¹H NMR (400 MHz, DMSO) δ 8.60-8.45 (m, 2H), 8.14 (s, 1H), 8.10 (d, J=2.0 Hz, 1H), 7.01-6.89 (m, 3H), 6.81 (dd, J=8.0, 1.8 Hz, 1H), 6.75 (td, J=7.6, 1.1 Hz, 1H), 6.65-6.53 (m, 2H), 5.57 (s, 1H), 5.49 (s, 1H), 4.50 (d, J=7.2 Hz, 2H), 2.89 (dt, J=15.1, 7.5 Hz, 1H), 1.97 (dd, J=8.2, 6.5 Hz, 2H), 1.90-1.78 (m, 4H).
HRMS m/z (ESI) calcd for C25H22N4S [M+H]+ 411.1565 found 411.1567.

Example 22 Synthesis of Compound 22

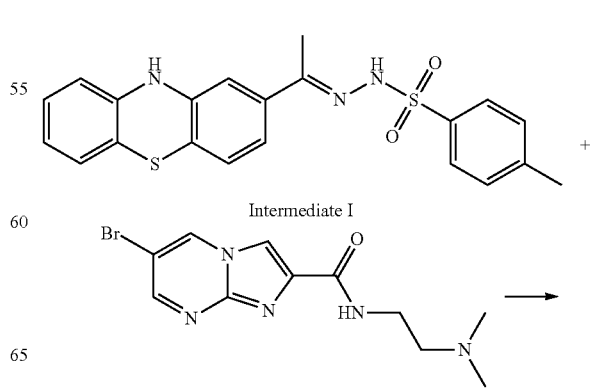

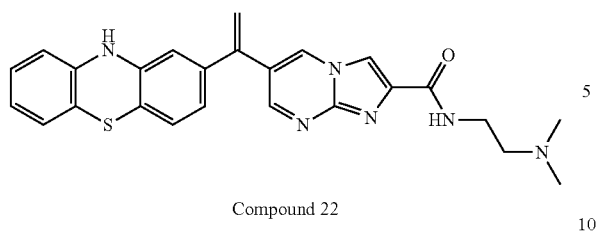

Compound 22

Compound 22 was prepared by a synthetic method similar to that of Example 1 with a yield of 47.5%.

$^1$H NMR and HRMS data of compound 22 are as follows:

$^1$H NMR (400 MHz, DMSO) δ 9.17 (s, 1H), 8.64 (s, 1H), 8.52 (d, J=1.4 Hz, 1H), 8.48 (s, 1H), 8.30 (t, J=5.7 Hz, 1H), 6.97 (ddd, J 16.5, 8.6, 3.9 Hz, 3H), 6.83 (dd, J=7.9, 1.7 Hz, 1H), 6.77 (td, J=7.5, 1.1 Hz. 1H), 6.70 (d, J=1.7 Hz, 1H), 6.66 (dd, J=7.9, 0.9 Hz, 1H), 6.04 (d, J=1.3 Hz, 1H), 5.51 (d, 1.3 Hz, 1H), 2.51 (d, J=1.6 Hz, 2H), 2.42 (t, J=6.5 Hz, 2H), 2.18 (s, 6H).

HRMS m/z (ESI) calcd for $C_{25}H_{24}N_6OS$ [M+H]$^+$ 457.1732 found: 457.1734.

Example 23 Synthesis of Compound 23

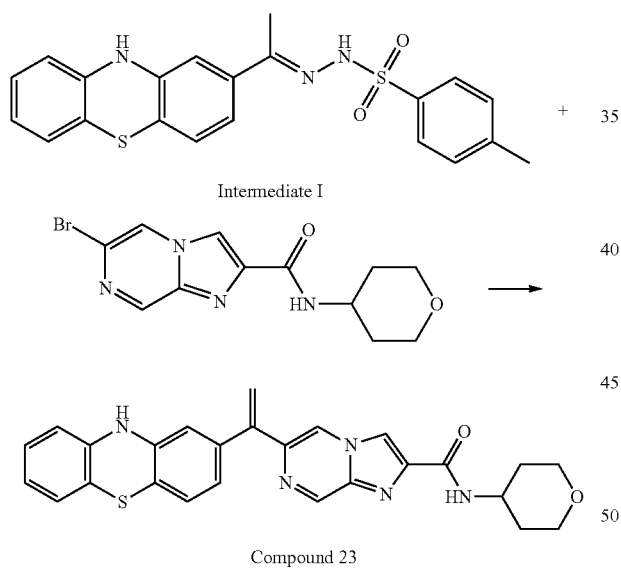

Compound 23

Compound 23 was prepared by a synthetic method similar to that of Example 1 with a yield of 50.4%.

$^1$H NMR and HRMS data of compound 23 are as follows:

$^1$H NMR (400 MHz, DMSO) δ 9.15 (s, 1H) 8.64 (s, 1H), 8.53 (d, J=1.3 Hz, 1H), 8.49 (s, 1H), 8.44 (d, J=8.3 Hz, 1H), 6.96 (dd, J=17.0, 7.8 Hz, 3H), 6.83 (dd, J=7.9, 1.7 Hz, 1H), 6.77 (td, J=7.6, 1.1 Hz, 1H), 6.70 (d, J=1.7 Hz, 1H), 6.66 (d, J=7.9 Hz, 1H), 6.04 (d, J=1.2 Hz, 1H), 5.51 (s, 1H), 4.08-3.97 (m, 1H), 3.90-3.82 (m, 2H), 3.43-3.36 (m, 2H), 1.70 (dd, J=9.9, 6.6 Hz, 4H).

HRMS m/z (ESI) calcd for $C_{26}H_{23}N_5O_2S$ [M+H]$^+$ 470.1572 found: 470.1574.

Example 24 Synthesis of Compound 24

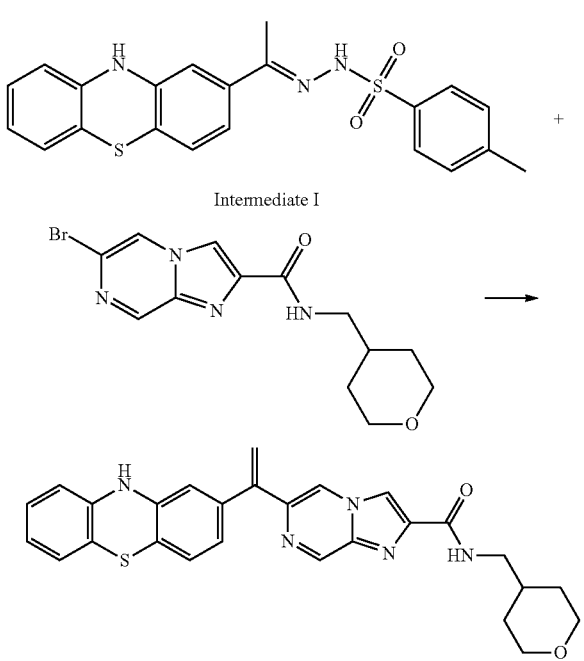

Compound 24

Compound 24 was prepared by a synthetic method similar to that of Example 1 with a yield of 49.6%.

$^1$H NMR and HRMS data of compound 24 are as follows:

$^1$H NMR (400 MHz, DMSO) δ 9.15 (s, 1H), 8.58 (dd, J=12.7, 6.5 Hz, 2H), 8.53 (d, J=1.1 Hz, 8.48 (s, 1H) 7.06-6.90 (m, 3H), 6.83 (dd, J=7.9, 1.6 Hz, 1H), 6.76 (t, J=7.5 Hz, 1H), 6.67 (dd, J 16.2, 4.7 Hz, 2H), 6.04 (s 1H), 5.52 (s, 1H), 3.83 (dd, J=11.3, 2.4 Hz, 2H), 3.30-313 (m, 4H), 1.93-1.73 (m, 1H), 1.57 (d, J=12.8 Hz, 2H), 1.23 (dd, J=4.8 Hz, 2H).

HRMS m/z (ESI) calcd for $C_{27}H_{25}N_5O_2S$ [M+H]$^+$ 484.1729 found: 484.1731.

Example 25 Synthesis of Compound 25

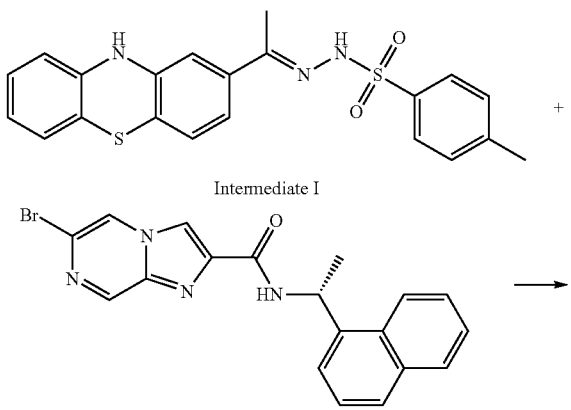

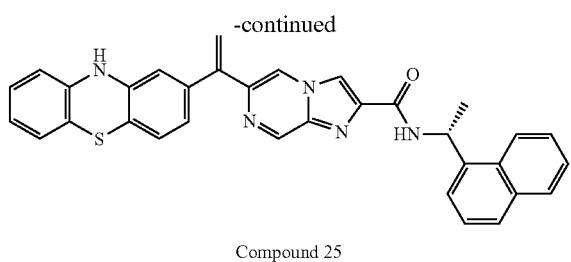

Compound 25

Compound 25 was prepared by a synthetic method similar to that of Example 1 with a yield of 38.7%.

¹H NMR and HRMS data of compound 25 are as follows:
¹H NMR (400 MHz, DMSO) δ 9.16 (s, 1H), 9.01 (d, J=8.4 Hz, 1H), 8.64 (s, 1H), 8.57-8.43 (m, 2H), 8.24 (d, J=8.3 Hz, 1H), 7.95 (d, J=7.9 Hz, 1H), 7.83 (d, J=8.2 Hz, 1H), 7.70 (d, J=7.0 Hz, 1H), 7.61-7.46 (m, 3H), 7.02-6.90 (m, 3H), 6.82 (dd, J=7.9, 1.7 Hz, 1H), 6.76 (td, J=7.6, 1.1 Hz, 1H), 6.70 (d, J=1.7 Hz, 1H), 6.66, 7.9 Hz, 1H), 6.04 (d, J=1.3 Hz, 1H), 5.98 (dd, J=14.9, 7.2 Hz, 1H), 5.51 (d, J=1.2 Hz, 1H) 1.67 (d, J=6.9 Hz, 3H).

HRMS m/z (ESI) calcd for C33H25N5OS [M+H]+ 540.1780 found: 540.1782.

Example 26 Synthesis of Compound 26

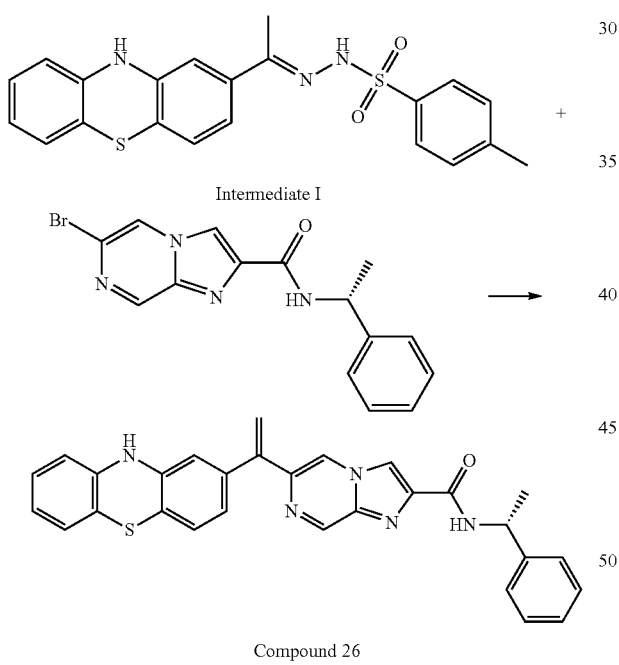

Compound 26

Compound 26 was prepared by a synthetic method similar to that of Example 1 with a yield of 57.9%.

¹H NMR and HRMS data of compound 26 are as follows:
¹H NMR (400 MHz, DMSO) δ 9.17 (S, 1H), 8.85 (d, J=8.5 Hz, 1H), 8.62 (s, 1H) 8.52 (d, J=1.3 Hz, 1H), 8.48 (s, 1H) 7.43 (d, J=7.2 Hz, 2H), 7.32 (t, J=7.5 Hz, 2H), 7.22 (t, J=7.3 Hz, 1H), 6.99 (dd, J=13.0, 4.7 Hz, 2H), 6.93 (dd, J=5.8, 1.8 Hz, 1H), 6.83 (dd, J=7.9, 1.7 Hz, 1H), 6.76 (td, J=7.6, 1.7 Hz, 1H), 6.69 (d, J=1.7 Hz, 1H) 6.65 (dd, J=7.9, 0.9 Hz, 1H), 6.04 (d, J=1.3 Hz, 1H), 5.51 (d, J=1.3 Hz, 1H), 5.23-5.12 (m, 1H), 1.52 (d, J=7.0 Hz, 3H), HRMS m/z (ESI) calcd for C29H23N5OS [M+H]+ 490.1625 found: 490.1625.

Example 27 Synthesis of Compound 27

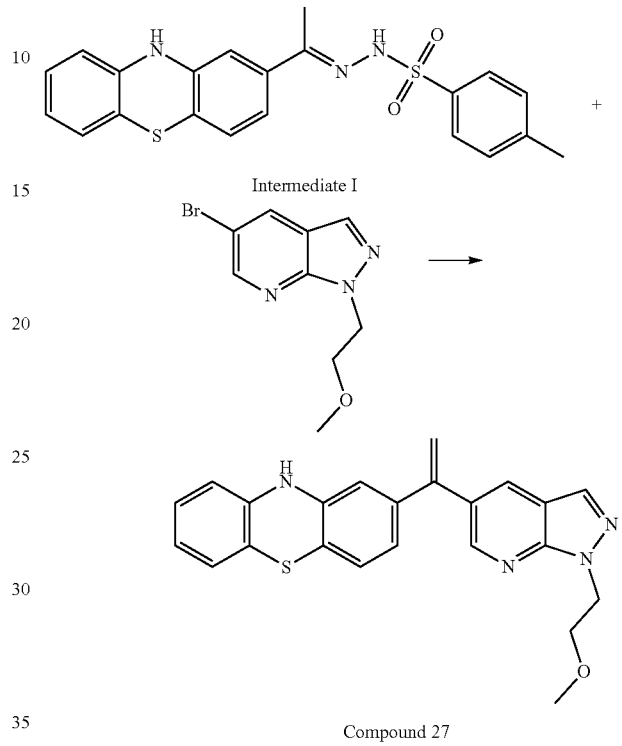

Compound 27

Compound 27 was prepared by a synthetic method similar to that of Example 1 with a yield of 50.7%.

¹H NMR and HRMS data of compound 27 are as follows:
¹H NMR (400 MHz, DMSO) δ 8.59H), 8.52 (d, J=1.9 Hz, 1H), 8.17 (s, 1H), 8.11 (d, J=1.9 Hz, 1H) 7.02-6.88 (m, 3H), 6.82 (dd, J=8.0, 1.5 Hz, 1H), 6.75 (t, J=7.5 Hz, 1H), 6.67-6.52 (m, 2H), 5.58 (s, 1H), 5.49 (s, 1H), 4.64 (t, J=5.4 Hz, 2H), 3.86 (t, J=5.4 Hz, 2H), 3.23 (s, 3H).

HRMS m/z (ESI) calcd for C23H20N4OS [M+H]+ 401.1358 found: 401.1360.

Example 28 Synthesis of Compound 28

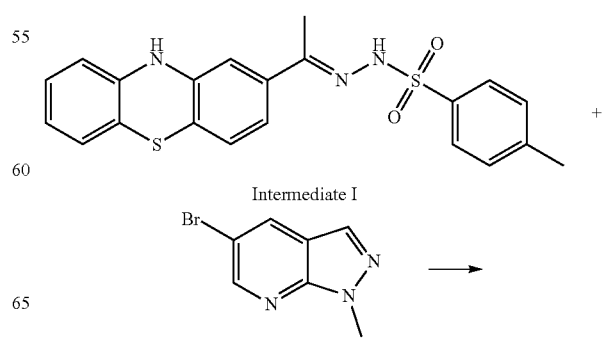

-continued

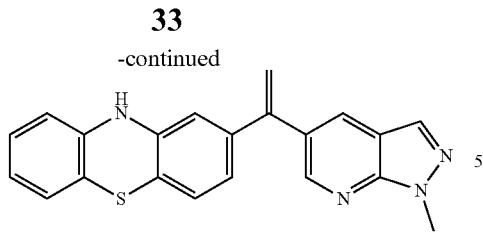

Compound 28

Compound 28 was prepared by a synthetic method similar to that of Example 1 with a yield of 53.8%.

¹H NMR and HRMS data of compound 28 are as follows:
¹H NMR (400 MHz, DMSO) δ 8.57 (s, 1H), 8.52 (d, J=1.8 Hz, 1H), 8.15 (s, 1H), 8.12 (d, J=1.7 Hz, 1H), 7.00-6.89 (m, 3H), 6.80 (d, J=8.0 Hz, 1H), 6.75 (t, J=7.5 Hz, 1H), 6.60 (dd, J=10.3, 4.7 Hz, 2H), 5.49 (s, 1H), 5.49 (s 1H), 4.09 (s, 3H).
HRMS m/z (ESI) calcd for $C_{21}H_{16}N_4S$ [M+H]⁺ 357.1096 found: 357.1098.

Example 29 Synthesis of Compound 29

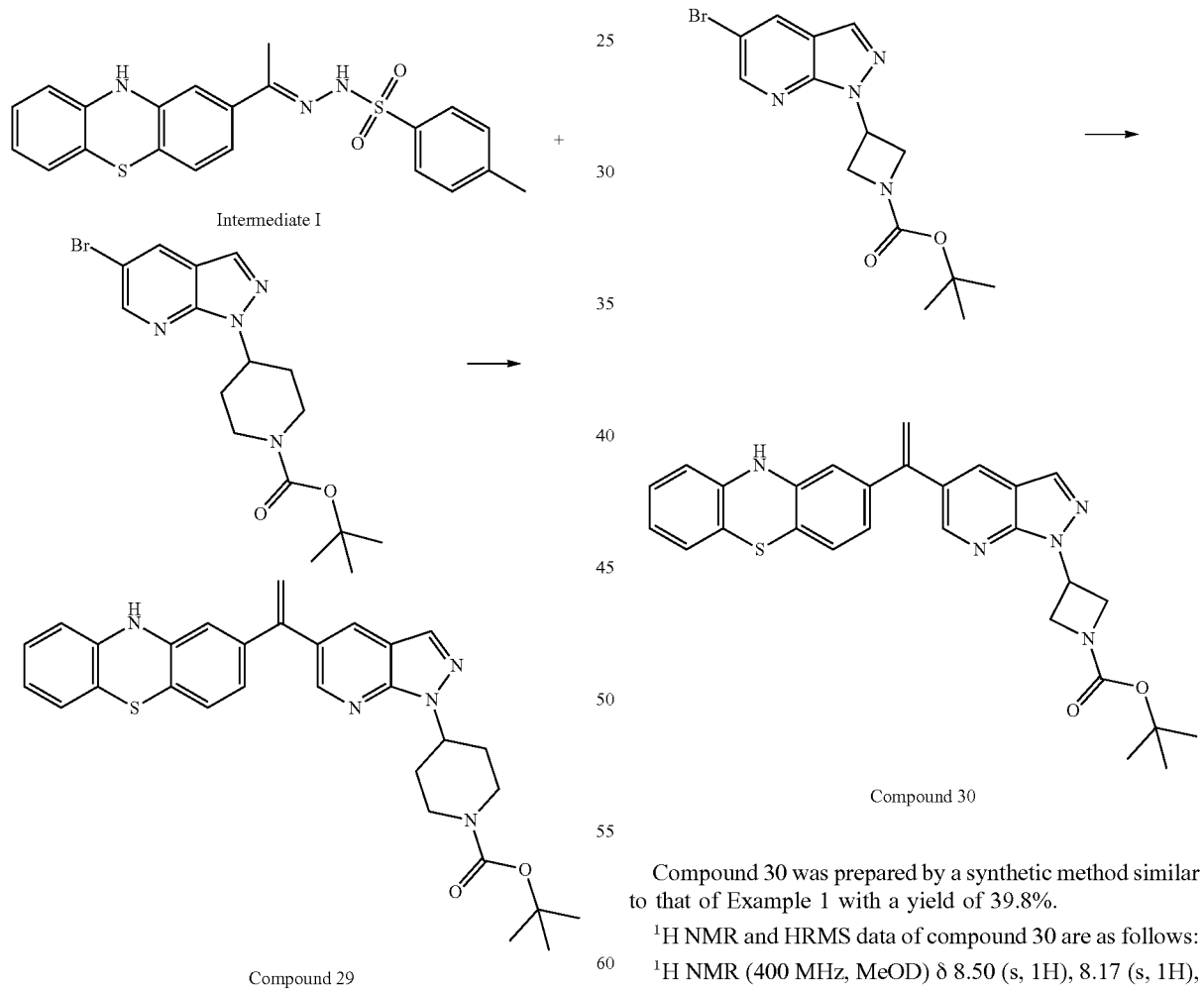

Compound 29

Compound 29 was prepared by a synthetic method similar to that of Example 1 with a yield of 36.9%.
¹H NMR and HRMS data of compound 29 are as follows:
¹H NMR (400 MHz, DMSO), δ 8.52 (d, J=12.1, Hz, 2H), 8.18 (s, 1H), 8.12 (s, 1H), 6.99-6.89 (m, 3H), 6.82 (d, J=7.9 Hz, 1H), 6.75 (t. J=7.5 Hz, 1H), 6.59 (d, J=11.5 Hz, 2H), 5.59 (s, 1H), 5.48 (s, 1H), 5.07 (td, J=11.0, 5.4 Hz, 1H), 4.11 (d, J=11.5 Hz, 2H), 3.04 (s, 2H), 2.11-1.99 (m, 2H), 1.95, (d, J=10.6 Hz, 2H), 1.44 (s, 9H)
HRMS m/z. (ESI) calcd for C30H31N5O2S [M+H]+ 526.2198 found: 526.2200.

Example 30 Synthesis of Compound 30

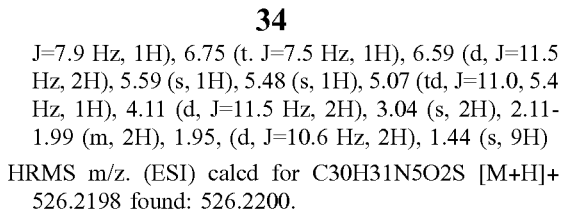

Intermediate I

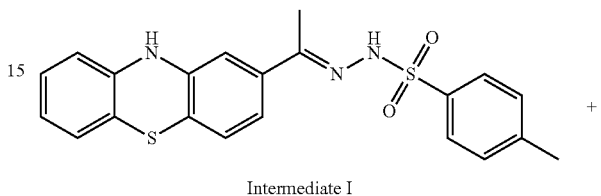

Compound 30

Compound 30 was prepared by a synthetic method similar to that of Example 1 with a yield of 39.8%.
¹H NMR and HRMS data of compound 30 are as follows:
¹H NMR (400 MHz, MeOD) δ 8.50 (s, 1H), 8.17 (s, 1H), 8.11 (s, 1H), 6.94 (t, J=7.6 Hz, 1H), 6.86 (d, J=7.8 Hz, 2H), 6.78-6.68 (m, 2H), 6.61-6.52 (m, 2H), 5.88-5.78 (m, 1H), 5.58 (s, 1H), 5.46 (s, 1H), 4.48 (d, J=6.5 Hz, 4H), 1.50 (s, 9H).
HRMS m/z (ESI) calcd for $C_{28}H_{27}N_5O_2S$ [M+H]⁺ 498.11885 found: 498.1887.

Example 31 Synthesis of Compound 31

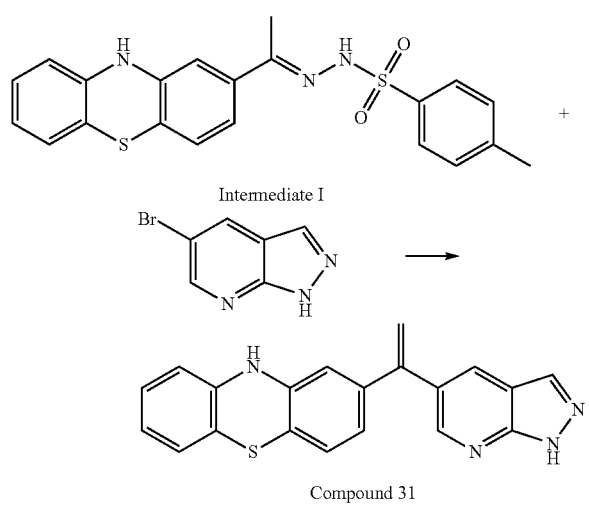

Compound 31 was prepared by a synthetic method similar to that of Example 1 with a yield of 53.4%.

¹H NMR and HRMS data of compound 31 are as follows:
¹H NMR (400 MHz, DMSO) δ 13.71 (s, 1H), 8.58-8.44 (m, 2H), 8.13 (dd, J=16.0, 1.4 Hz, 2H), 7.00-6.89 (m, 3H), 6.81 (dd, J=8.0, 1.8 Hz, 1H), 6.75 (td, J=7.6, 1.1 Hz, 1H), 6.59 (dd, J=9.0, 4.8 Hz, 2H), 5.56 (s, 1H), 5.49 (s, 1H).
HRMS m/z (ESI) calcd for $C_{20}H_{14}N_4S$ [M+H]⁺ 343.0939 found: 343.0941.

Example 32 Synthesis of Compound 32

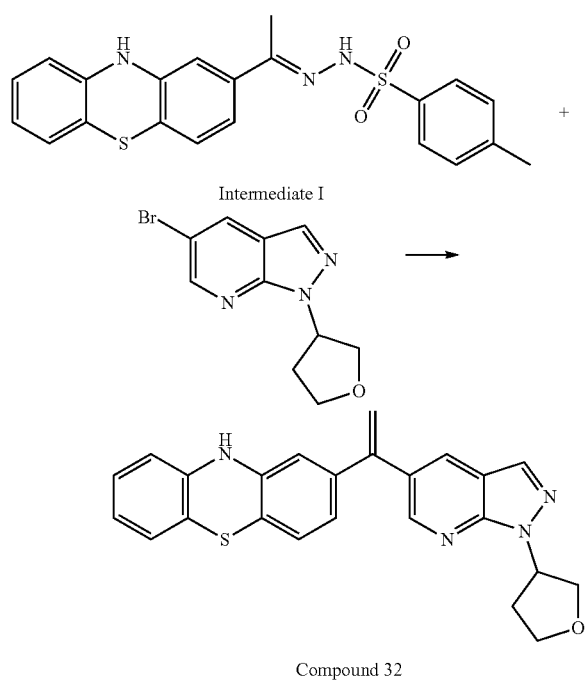

Compound 32 was prepared by a synthetic method similar to that of Example 1 with a yield of 54.3%.

¹H NMR and HRMS data of compound 32 are as follows:
¹H NMR (400 MHz, DMSO) δ 8.52 (d, J=2.0 Hz 2H), 8.32 (s, 1H), 8.16 (d, J=2.0 Hz, 1H), 7.00-6.88 (m, 3H), 6.82-6.71 (m, 2H), 6.58 (dd, J=11.0, 4.4 Hz, 2H), 6.22-6.13 (m, 1H), 5.59 (s, 1H), 5.49 (s, 1H), 5.10 (t, J=6.4 Hz, 2H), 5.07-5.02 (m, 2H), 3.38 (q, J=7.0 Hz, 2H).
HRMS m/z (ESI) calcd for $C_{24}H_{20}N_4OS$ [M+H]⁺ 413.1358 found: 413.1360.

Example 33 Synthesis of Compound 33

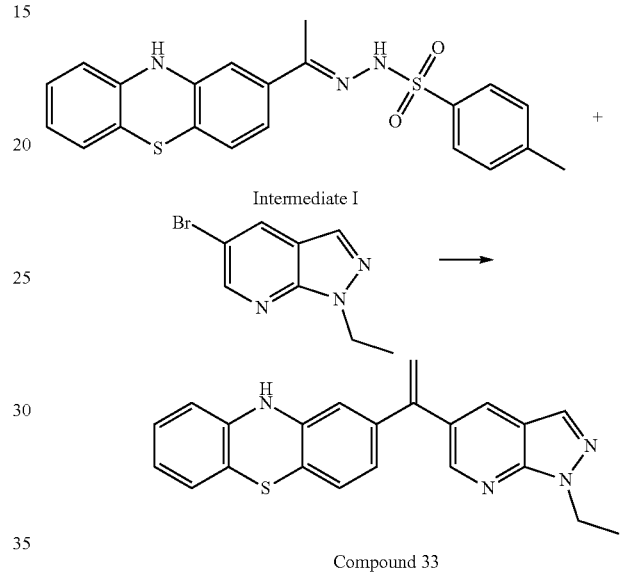

Compound 33 was prepared by a synthetic method similar to that of Example 1 with a yield of 53.6%.

¹H NMR and HRMS data of compound 33 are as follows:
¹H NMR (400 MHz, DMSO) δ 8.57-8.47 (m, 2H), 8.15 (s, 1H), 8.11 (d, J=2.1 Hz, 1H), 6.99-6.90 (m, 3H), 6.82 (dd, J=8.0, 1.8 Hz, 1H), 6.75 (td, J=7.6, 1.0 Hz, 1H), 6.62-6.54 (m, 2H), 5.58 (s, 1H), 4.51 (q, J=7.2 Hz, 2H), 1.45 (t, J=7.2 Hz, 3H).
HRMS m/z (ESI) calcd for $C_{22}H_{18}N_4S$ [M+H]⁺ 371.1252 found: 371.1255.

Example 34 Synthesis of Compound 34

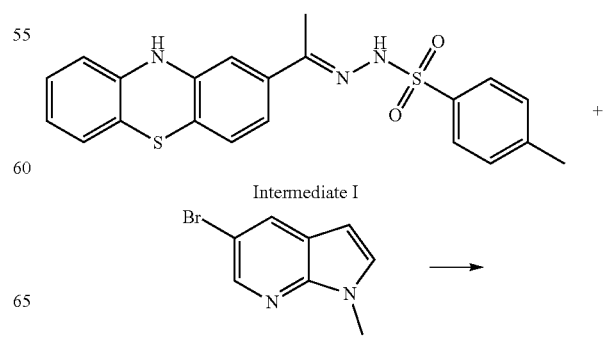

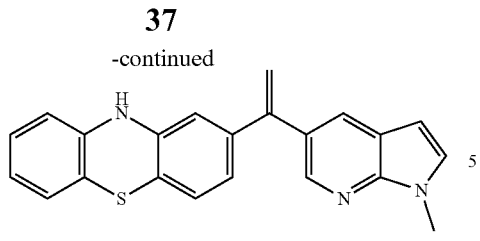

Compound 34

Compound 34 was prepared by a synthetic method similar to that of Example 1 with a yield of 55.5%.

$^1$H NMR and HRMS data of compound 34 are as follows:

$^1$H NMR (400 MHz, DMSO) δ 8.51 (s, 1H), 7.46 (d, J=1.2, Hz, 1H), 7.42 (d, J=8.5 Hz, 1H), 7.33 (d, J=3.1 Hz, 1H), 7.10 (dd, J=8.5, 1.6 Hz, 1H), 6.96 (td, J=7.8, 1.4 Hz, 1H), 6.93-6.88 (m, 2H), 6.81-6.71 (m, 2H), 6.61 (dd, J=5.6, 1.4 Hz, 2H), 6.42 (d, J=2.5 Hz, 1H), 5.34 (s, 2H), 3.80 (s, 3H).

HRMS m/z (ESI) calcd for $C_{22}H_{17}N_3S$ [M+H]$^+$ 356.1143 found: 356.1145.

Example 35 Synthesis of Compound 35

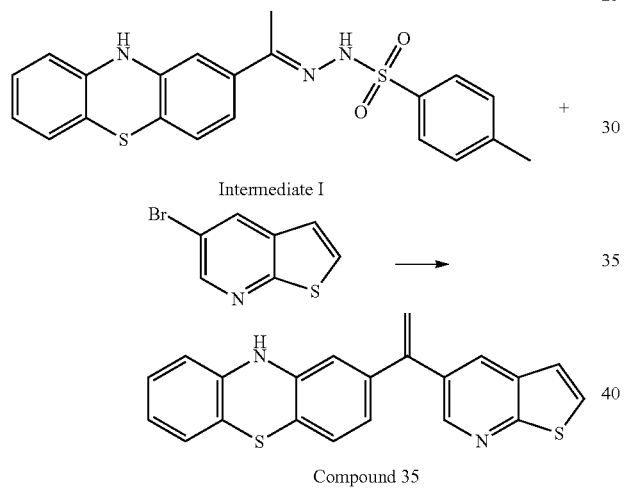

Compound 35

Compound 35 was prepared by a synthetic method similar to that of Example 1 with a yield of 45.4%.

$^1$H NMR and HRMS data of compound 35 are as follows:

$^1$H NMR (400 MHz, DMSO) δ 8.00 (d, J=8.4 Hz, 1H), 7.78 (d, J=5.5 Hz, 2H), 7.47 (dd, J=7.5, 3.6 Hz, 2H), 7.34-7.30 (m, 1H), 6.99-6.90 (m, 3H), 6.82 (dd, J=7.9, 1.8 Hz, 1H), 6.74 (td, J 7.6, 1.1 Hz, 1H), 6.62-6.57 (m, 2H), 5.49 (s, 1H) 5.45 (s, 1H).

HRMS m/z (ESI) calcd for $C_{21}H_{14}N_2S_2$[M+H]$^+$ 359.0598 found: 359.0600.

Example 36 Synthesis of Compound 36

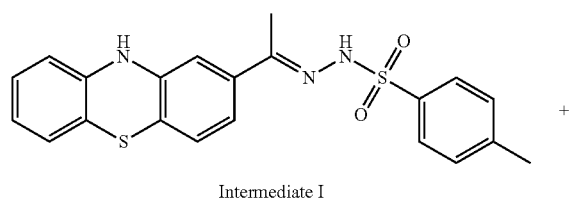

Intermediate I

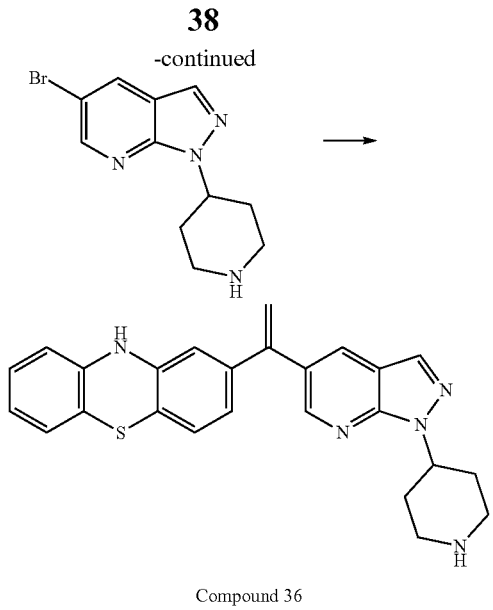

Compound 36

Compound 36 was prepared by a synthetic method similar to that of Example 1 with a yield of 36.7%.

$^1$H NMR and HRMS data of compound 36 are as follows:

$^1$H NMR (400 MHz, DMSO) δ 8.59 (s, 1H), 8.51 (d, J=1.8 Hz, 1H), 8.22 (s, 1H), 8.15 (s, 1H), 7.03-6.88 (m, 3H), 6.83-6.71 (m, 2H), 6.67-6.57 (m, 2H), 5.59 (s, 1H), 5.49 (s, 1H), 5.30-5.13 (m, 1H), 3.28-3.15 (m, 4H), 2.38 (ddd, J=15.1, 13.6, 3.6 Hz, 2H), 2.14 (d, J=12.0 Hz, 2H).

HRMS m/z (ESI) calcd for $C_{25}H_{23}N_5S$ [M+H]$^+$ 426.1674 found 426.1676.

The beneficial effects of the present disclosure are demonstrated below through specific test examples.

Test Example 1 for Biological Activity. Study on the Inhibition Rate of Compounds of the Present Disclosure on Ferroptosis In this example, in order to study the inhibitor of ferroptosis, a screening model for ferroptosis was constructed in house, and the details are as follows:

The screening model for ferroptosis mainly used the MTT cell viability assay. First, the fibrosarcoma cell line was cultured in a dish, and the cells in the logarithmic growth phase were seeded in a 96-well plate in specific numbers (3000-10000 cells/well), 100 μL per well, and then cultured in an incubator at 37° C. and 5% $CO_2$ to allow the cells to adhere. After 24 h, 100 μL of compounds at certain concentrations prepared in the indicated medium and the ferroptosis inducer Erastin (final concentration of 10 μM) were added, and wells in triplicate were set up for each compound to ensure the accuracy of the results. A negative control group, positive control group (5 μM of ferrostain-1), blank control group and solvent control group were also set. After dosing, cells were placed in the incubator and cultured for 72 h. On the day of the MTT test, MTT test solution (5 mg/mL MTT solution dissolved in physiological saline, stored at 4° C. in the dark) was pre-prepared, and 20 μL was added to each well. Cells were placed in the incubator and cultured for another 2-4 h. Then, 50 μL of 20% SDS solution (dissolved in MiliiQ water, added with 1% concentrated hydrochloric acid) was added to each well, and cells were placed in the incubator overnight. The next day, the absorbance value at 570 nm was detected with a microplate reader to calculate the inhibition rate of the drug on ferroptosis. Generally, the absorbance value of the control group should be between 0.8-1.2 as a normal value. After obtaining the absorbance value data, the average value of wells in triplicate was calculated, and the inhibition rate was calculated using the following formula:

Inhibition rate (IR) %=[1−($A_{experimental\ group}$−$A_{blank}$)/($A_{solvent}$−$A_{blank}$)]*100%

The curve of inhibition rate change was fitted using Graph Pad Prism 5 software to obtain $EC_{50}$.

The compounds prepared in the examples were subjected to the $EC_{50}$ test (the $EC_{50}$ in the test was obtained from the average of three tests with ferrostain-1 as the positive control), and the results were shown in the following table:

TABLE 1

$EC_{50}$ of compounds of the present disclosure

| Compound | $EC_{50}$ (μM) |
| --- | --- |
| 2 | 0.038 |
| 4 | 0.076 |
| 6 | 0.015 |
| 7 | 0.024 |
| 8 | 0.055 |
| 9 | 0.012 |
| 10 | 0.015 |
| 11 | 0.033 |
| 13 | 0.037 |
| 14 | 0.006 |
| 15 | 0.010 |
| 16 | 0.010 |
| 17 | 0.089 |
| 19 | 0.013 |
| 20 | 0.0002 |
| 22 | 0.014 |
| 23 | 0.067 |
| 24 | 0.056 |
| 25 | 0.055 |
| 26 | 0.076 |
| 27 | 0.073 |
| 29 | 0.029 |
| 30 | 0.092 |
| 31 | 0.011 |
| 32 | 0.050 |
| 33 | 0.067 |
| 34 | 0.042 |
| 35 | 0.074 |
| 36 | 0.016 |
| Ferrostain-1 | 0.060 |

It can be seen from Table 1 that the compounds prepared in the present disclosure had good inhibitory effects on ferroptosis, especially compound 14 and compound 20, which had excellent inhibitory effects on ferroptosis, significantly better than the positive drug ferrostain-1, and thus can be used for the preparation of a ferroptosis inhibitor and a medicament for treating ferroptosis-related diseases such as neurodegenerative disease, tissue ischemia-reperfusion injury, cerebral stroke, cardiovascular disease, renal failure, and diabetic complications.

Test Example 2 for Biological Activity

A middle cerebral artery occlusion (MCAO) cerebral stroke model (also called cerebral ischemia model) in rat was established by the suture method, to study the therapeutic effects of the compounds of the present disclosure on ischemic cerebral stroke in SD rats after multiple administrations.

30 male SD rats were subjected to anesthesia induced with enflurane at 4%-5% volume fraction and maintained with 1%-2% enflurane mixed with 70% N2O and 30% O2. The middle cerebral artery was occluded by the suture method to establish a rat model of ischemia. The ischemic rats were placed at room temperature to keep their body temperature at 37° C. 1.5 hours later, the suture was pulled out for reperfusion. The experiment was carried out with 3 groups (10 random SD rats in each group): model control group (Vehicle), sample group (administered with compound 14 of the present disclosure), and positive drug group (administered with Fer-1). The animals in each group were subjected to middle cerebral artery occlusion with a suture for 1.5 h before the suture was pulled out for reperfusion, and were dissected 24 h after reperfusion. Each group was administered intravenously once within 30 minutes of middle cerebral artery occlusion with a suture and once at 2 hours after reperfusion, for a total of 2 administrations, and the dosage in each group was 5 mg/kg. The cerebral infarction volume in each group was calculated by TTC staining 1 day after dissection. Cerebral infarction volume=cerebral infarction area %*brain volume. The experimental results are shown in FIG. 1.

Test Example 3 for Biological Activity. Activity Test of Compounds of the Present Disclosure in Rat MCAO Cerebral Stroke Model 1. Experiment Method Through the middle cerebral artery occlusion (MCAO) cerebral stroke model (also known as cerebral ischemia model) in rat, the therapeutic effects of the compounds of the present disclosure at different doses and single administration on ischemic cerebral stroke in SD rats were studied.

Male SD rats were subjected to anesthesia induced with 2-3.0% isoflurane, and the middle cerebral artery was occluded by the suture method to establish a rat model of ischemia. The ischemic rats were placed at room temperature to keep their body temperature at 37° C. After 90 min, the suture was pulled out for reperfusion.

The experiment was carried out with 6 groups: model control group, two administration groups of example compound 14 (2.5 mg/kg in the low-dose group and 5 mg/kg in the high-dose group), and two administration groups of the comparative compound 1 (2.5 mg/kg in the low-dose group and 5 mg/kg in the high-dose group) and positive drug administration group (butylphthalide with administration dose of 5 mg/kg). Each group was assigned to 18 model animals, and within 10 min of reperfusion, compound 14, comparative compound 1 and positive drug were administered via tail vein injection. After 24 h of reperfusion, the animals were scored by NSS to evaluate neurological function, and then the animals were dissected to remove the brain for TTC staining. By determining the size of cerebral infarction and calculating the inhibition rate, the therapeutic effects of the test compounds on ischemic cerebral stroke in rats were evaluated comprehensively. Wherein, the comparative compound 1 is the compound 38 of Example 2 in Chinese Patent Application Publication CN108484527A shown in the following formula.

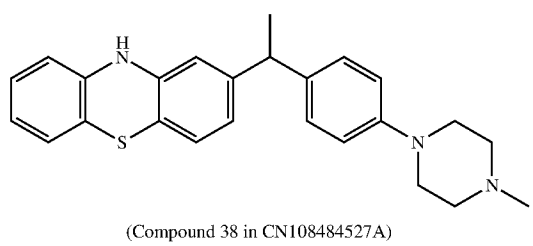 [SMILES: CC(c1ccc(N2CCN(C)CC2)cc1)c1ccc2c(c1)Nc1ccccc1S2]

(Compound 38 in CN108484527A)

The percentage of infarct tissue weight in the whole brain was used as the infarct size (%), and the inhibition rate (%) of each drug treatment group was calculated based on the infarct size. The inhibition rate was calculated with the following formula:

$$\text{Inhibition rate (\%)} = \frac{\text{Infarct size of model group} - \text{Infarct size of treatment group}}{\text{Infarct size of model group}} \times 100\%$$

2. Test Results:
(1) Size of Cerebral Infarction and Inhibition Rate of Cerebral Infarction:

The high and low dose administration groups of compound 14 and the high and low dose administration groups of control compound 1 can reduce the range of necrosis of brain tissue lesions, as shown in Table 2 below:

TABLE 2

Size of cerebral infarction and inhibition rate of cerebral infarction in experimental animals

| Test compound | Dosage | Infarct area weight (g) | Whole brain weight (g) | Infarct size (%) | Inhibition rate of cerebral infarction (%) |
|---|---|---|---|---|---|
| Model control | — | 0.17 ± 0.05 | 1.23 ± 0.07 | 14.08 ± 3.67 | — |
| Compound 14 | 2.5 mg/kg | 0.15 ± 0.07 | 1.23 ± 0.08 | 12.11 ± 5.69 | 14.0 |
|  | 5 mg/kg | 0.12 ± 0.05 | 1.2 ± 0.08 | 9.95 ± 4.69 | 29.3 |
| Comparative Compound 1 | 2.5 mg/kg | 0.14 ± 0.07 | 1.24 ± 0.07 | 11.4 ± 5.64 | 19.0 |
|  | 5 mg/kg | 0.11 ± 0.05 | 1.2 ± 0.12 | 9.35 ± 3.54* | 33.6 |
| Positive drug | 5 mg/kg | 0.18 ± 0.09 | 1.23 ± 0.08 | 13.93 ± 6.97 | 1.1 |

Note:
"—" means no data for this item,
*means P < 0.05 compared with model control animals.

Test Example 4 for Biological Activity. Effect of Compounds of the Present Disclosure on Human hERG Ion Channel Expressed in HEK293 Cells at Steady State Determined by Patch Clamp The hERG ion channel steady-state expressing HEK293 cells were transferred to a perfusion tank and perfused with extracellular fluid at room temperature. Each cell was used as a control. All test compounds were dissolved by shaking with dimethyl sulfoxide and prepared as serial concentrations of 0.3 μM, 1 μM, 3 μM, 10 μM and 30 μM. The test compounds were perfused using a perfusion system utilizing their own gravity. At least two cells were tested for each concentration. After the current was stable (or 5 min), the current magnitude changes before and after the compound was used were compared to calculate the blocking effect of the compound. Test electrodes were pulled with PC-10. Whole-cell patch clamp was used to record, with noise filtered at one-fifth of the sampling frequency. Cells were clamped at −80 mV, depolarized to +60 mV for 850 ms with a square wave lasting 4 s, and then repolarized to −50 mV for 1275 ms to elicit hERG tail currents. This procedure was repeated every 15 seconds. hERG tail currents were pure hERG currents. After the current was stabilized, the administration was performed by continuous extracellular perfusion from low concentration to high concentration. Starting from a low concentration, perfusion was continued until the drug effect was stable, and then perfusion of the next concentration was performed.

Stimulus delivery and signal acquisition were performed by the Patch Master software. The signal was amplified with a patch clamp amplifier with a filtering of 10 KHz. Fit Master, EXCEL, Graph Pad Prism and SPSS 21.0 were used for further data analysis and curve fitting. In data processing, when judging the blocking effect on hERG the peak value of the tail current and its baseline were corrected. The effect of each compound at different concentrations was expressed by the inhibition rate of the tail current.

Inhibition rate %=100×(peak value of tail current before administration-peak value of tail current after administration)/peak value of tail current before administration SD≤15 of the inhibition rate of all cells at each concentration was taken as the acceptable standard.
IC$_{50}$ values were fitted by the Hill equation:

$$y = \left[\frac{\max - \min}{1 + \left(\frac{[\text{drug}]}{IC_{50}}\right)^{n_H}}\right] + \min$$

Test Results

| Compound | Structural formula | hERG IC$_{50}$ (μM) |
| --- | --- | --- |
| Terfenadine | 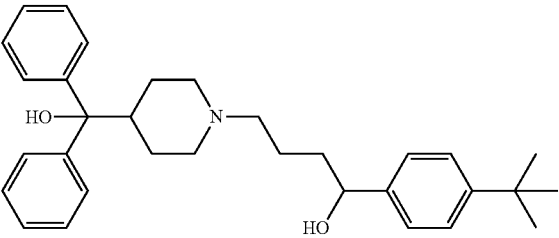 [SMILES: CC(C)(C)c1ccc(C(O)CCCN2CCC(C(O)(c3ccccc3)c3ccccc3)CC2)cc1] | 0.043 |
| Comparative Compound 1 | 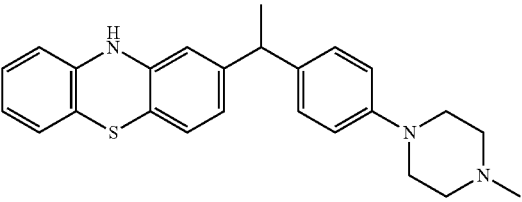 [SMILES: CC(c1ccc(N2CCN(C)CC2)cc1)c1ccc2c(c1)Nc1ccccc1S2] | 0.34 |
| Comparative Compound 2 | 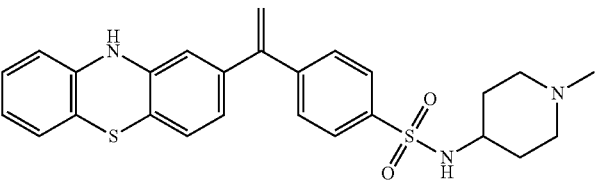 [SMILES: C=C(c1ccc(S(=O)(=O)NC2CCN(C)CC2)cc1)c1ccc2c(c1)Nc1ccccc1S2] | 0.71 |
| Compound 14 of the present disclosure | 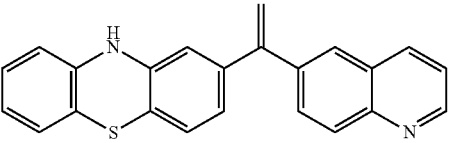 [SMILES: C=C(c1ccc2c(c1)Nc1ccccc1S2)c1ccc2ncccc2c1] | >30 |

Note: The comparative compound 1 is compound 38 of CN108484527A, and the comparative compound 2 is compound 59 of CN111574474A. Terfenadine has been withdrawn from the FDA because of cardiotoxic side effects such as delayed cardiac repolarization due to its severe influence on myocardial ion channels.

Cardiovascular and cerebrovascular diseases are chronic diseases, which usually require lifelong management and long-term medication. Therefore, in addition to the exact curative effect, the safety of the therapeutic drug must reach a very high level to effectively ensure the safety of patients' long-term medication.

The main causes of drug-induced cardiotoxicity include blocking the rapid delayed rectifier current (IKr) of the heart, resulting in prolongation of the QT interval in the cardiac action potential time course, and then inducing torsade de pointes (TdP), which can cause sudden death in severe cases.

In the field of drug development, compounds with significantly lower hERG IC$_{50}$ values imply a higher potential risk of cardiotoxicity, and compounds with sufficiently high hERG IC$_{50}$ values are considered adequate cardiac safety.

The above results show that the compounds of the present disclosure exemplified by compound 14 have no significant effect on the human hERG ion channel expressed in HEK293 cells in a steady state, and have good cardiac safety. The cardiac safety data characterized by the hERG inhibitory concentration IC$_{50}$ value shows that, compared with other structures, the compounds of the present disclosure exemplified by compound 14 have significantly improved cardiac safety by, for example, about 100 times compared with the cardiac safety (IC$_{50}$ value for hERG assay) of comparative compound 1, or about 50 times compared with the cardiac safety of compound 59 of CN111574474A.

In conclusion, the present disclosure has synthesized a new phenothiazine compound, which has a good inhibitory effect on ferroptosis and can be used for the preparation of ferroptosis inhibitor and also a medicament for treating cardiovascular and cerebrovascular diseases such as cerebral stroke, and ferroptosis-related diseases such as neurodegenerative disease, tumor, tissue ischemia-reperfusion injury, renal failure, and diabetic complications. Meanwhile, the compounds of the present disclosure exemplified by compound 14 have very good druggability, such as better cardiac safety, solubility, and no hemolysis reaction, and can be prepared as injections with broad market prospects.

The invention claimed is:

1. A compound represented by formula IV, a salt thereof, or a stereoisomer thereof:

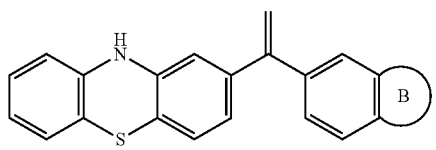

formula IV wherein,
ring B is selected from 5- to 6-membered unsaturated heterocyclyl independently substituted by n $R_2$;
n is an integer of 0~3;
each $R_2$ is independently selected from substituted or unsubstituted $C_1$~$C_3$ alkyl, halogen, amino, —C(O)NR$_3$R$_4$, —C(O)R$_5$ and —C(O)OR$_5$; or two $R_2$ on the same carbon atom constitute =O;
$R_3$ and $R_4$ are independently selected from hydrogen, substituted $C_1$~$C_2$ alkyl, and substituted aryl;
$R_5$ is independently selected from hydrogen and $C_1$~$C_2$ alkyl;
the substituent of the alkyl is selected from substituted or unsubstituted 5- to 6-membered saturated heterocyclyl, 4- to 6-membered saturated cycloalkyl, —NR$_6$R$_7$, aryl, naphthyl, and $C_1$~$C_3$ alkoxy;
$R_6$ and $R_7$ are independently selected from C~$C_3$ alkyl;
the substituent of the saturated heterocyclyl is selected from $C_1$~$C_8$ alkyl and —C(O) OR$_5$;
the substituent of the aryl is selected from $C_1$~$C_2$ alkyl and nitro; and
the heteroatom of the heterocyclyl is selected from N, O and S.

2. A compound represented by formula V, a salt thereof, or a stereoisomer thereof:

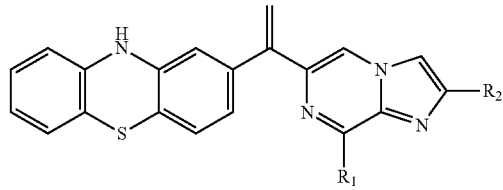

formula V wherein,
$R_1$ is selected from hydrogen and 4- to 6-membered saturated heterocyclyl;
$R_2$ is null, or $R_2$ is selected from substituted or unsubstituted $C_1$~$C_3$ alkyl, halogen, substituted or unsubstituted 4- to 6-membered saturated heterocyclyl, —C(O)NR$_3$R$_4$, —C(O)R$_5$ and —C(O)OR$_5$;
$R_3$ and $R_4$ are independently selected from hydrogen, substituted or unsubstituted $C_1$~$C_3$ alkyl, 4- to 6-membered saturated heterocyclyl, and substituted 4- to 5-membered unsaturated cycloalkyl;
$R_5$ is selected from hydrogen and $C_1$~$C_4$ alkyl;
the substituent of the alkyl is selected from substituted or unsubstituted 4- to 6-membered saturated heterocyclyl, 4- to 6-membered saturated cycloalkyl, —NR$_6$R$_7$, aryl, and naphthyl;
$R_6$ and $R_7$ are independently selected from $C_1$~$C_2$ alkyl;

the substituent of the saturated heterocyclyl is selected from $C_1$~$C_4$ alkyl and —C(O)OR$_5$;
the substituent of the unsaturated cycloalkyl is selected from $C_1$~$C_4$ alkyl, nitro, halogen, hydroxyl; and
the heteroatom of the heterocyclyl is selected from N, O and S.

3. A compound selected from the following group, a salt thereof, or a stereoisomer thereof:

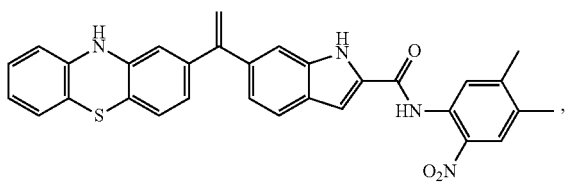

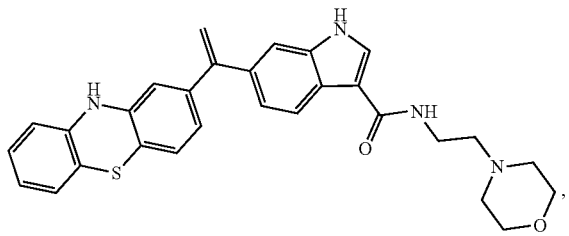

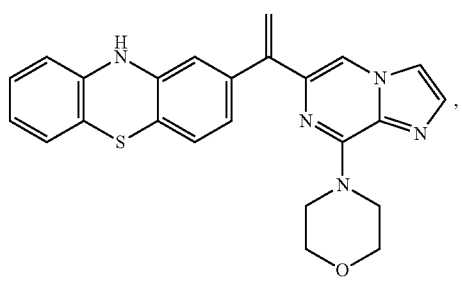

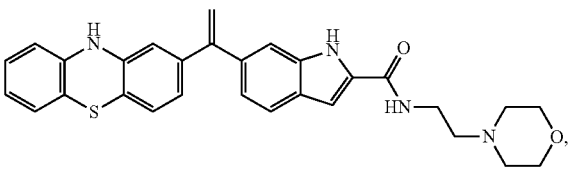

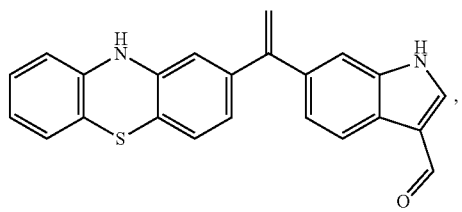

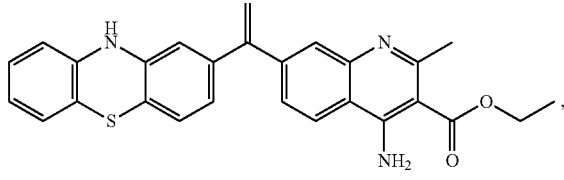

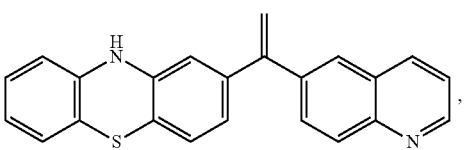

-continued

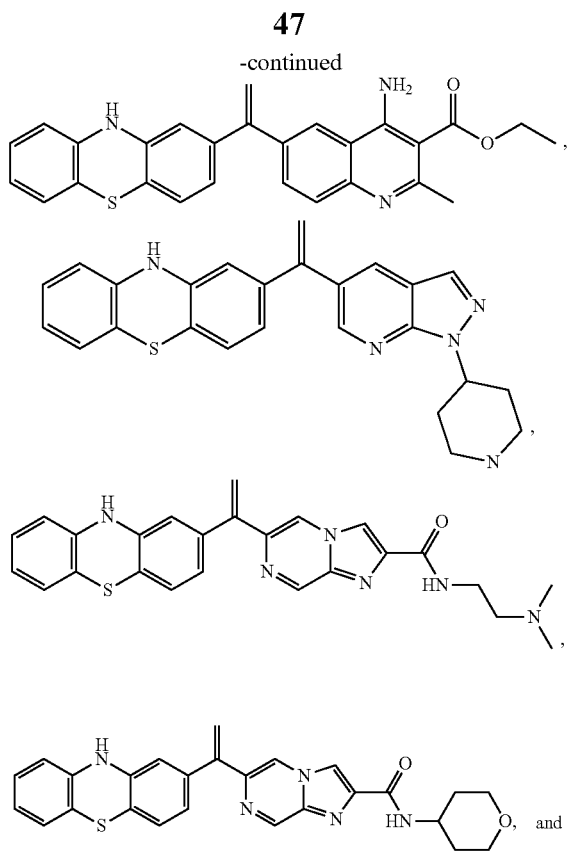

-continued

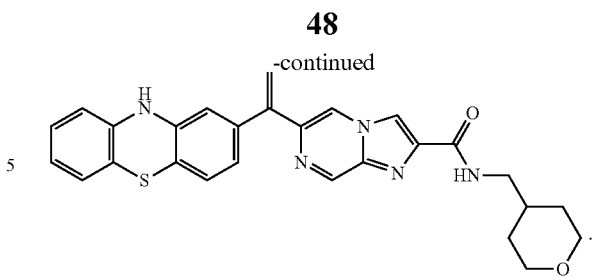

4. A method of inhibiting ferroptosis, comprising administrating the compound, a salt thereof, or a stereoisomer thereof according to claim 1 to a subject in need thereof.

5. A method of treating a neurodegenerative disease, tumor, tissue ischemia-reperfusion injury, cardiovascular disease, cerebrovascular disease, or renal failure, comprising administrating the compound, a salt thereof, or a stereoisomer thereof according to claim 1 to a subject in need thereof.

6. A pharmaceutical composition comprising the compound, a salt thereof, or a stereoisomer thereof according to claim 1 as an active ingredient, and optionally a pharmaceutically acceptable auxiliary.

7. The method according to claim 5, wherein the cerebrovascular disease is cerebral stroke.

8. The method according to claim 5, wherein the neurodegenerative disease is Alzheimer's disease or Parkinson's disease.

9. The pharmaceutical composition according to claim 6, wherein the pharmaceutical composition is in the form of an oral preparation or an intravenous injection preparation.

* * * * *